(12) United States Patent
Akashi

(10) Patent No.: US 7,692,821 B2
(45) Date of Patent: Apr. 6, 2010

(54) IMAGE-PROCESSING APPARATUS AND METHOD FOR CONTROLLING IMAGE-PROCESSING APPARATUS

(75) Inventor: Masamichi Akashi, Funabashi (JP)

(73) Assignee: Canon Kabushiki Kaisha, Tokyo (JP)

(*) Notice: Subject to any disclaimer, the term of this patent is extended or adjusted under 35 U.S.C. 154(b) by 1136 days.

(21) Appl. No.: 11/303,834

(22) Filed: Dec. 16, 2005

(65) Prior Publication Data

US 2006/0132857 A1 Jun. 22, 2006

(30) Foreign Application Priority Data

Dec. 17, 2004 (JP) ............................ 2004-366005

(51) Int. Cl.
*H04N 1/40* (2006.01)
*G06F 17/00* (2006.01)

(52) U.S. Cl. ...................................... 358/448; 707/101
(58) Field of Classification Search ................. 358/448, 358/527, 487, 453, 474, 452, 518, 1.15, 1.16, 358/1.14, 400, 426; 715/209, 245, 248, 201; 707/1, 6, 10, 100, 101, E17.019; 382/100, 382/167, 232, 233, 112, 224
See application file for complete search history.

(56) References Cited

U.S. PATENT DOCUMENTS 6,295,133 B1 * 9/2001 Bloomquist et al. .......... 358/1.1

FOREIGN PATENT DOCUMENTS

| JP | 6-062251 A | 3/1994 |
| JP | 9-284548 A | 10/1997 |

* cited by examiner

*Primary Examiner*—Saeid Ebrahimi Dehkordy
(74) *Attorney, Agent, or Firm*—Canon U.S.A., Inc., IP Division

(57) ABSTRACT

An image processing apparatus transfers scan image data acquired by a document reader to an editing apparatus and receives print data based on the scan image data from the editing apparatus. The apparatus includes a first generator generating first attribute data from the scan image data and a second generator generating second attribute data based on the print data received from the editing apparatus. The first and second attribute data indicate an image attribute constituting the scan image data and an image attribute constituting print image data generated based on the print data, respectively. The image processing apparatus further includes a third generator generating third attribute data for each of the pixels constituting the print image data based on attribute information of the corresponding pixel in the first and second attribute data.

18 Claims, 21 Drawing Sheets

IMAGE-PROCESSING APPARATUS AND METHOD FOR CONTROLLING IMAGE-PROCESSING APPARATUS

BACKGROUND OF THE INVENTION

1. Field of the Invention

The present invention relates to an image-processing apparatus for transferring scan image data acquired in a document-reading section to an editing apparatus and receiving print data including the above-described scan image data from the editing apparatus to carry out image processing, and further relates to a method for controlling such an image-processing apparatus.

2. Description of the Related Art

It is known that image-processing apparatuses having image-reading sections determine image attributes (e.g., photography area and character area) in scan image data acquired by reading a source document and generate attribute information representing such image attributes. By applying predetermined image processing to each of the photography and character areas according to this attribute information, an optimal output for the photographic image and the character image can be acquired (refer to Japanese Patent Laid-Open No. 6-062251).

In general, scan image data acquired by reading a source document on an image-reading section is produced as image data in the bitmap format. For this reason, all characters and line images in the source document are processed as "bitmapped images." This causes such characters and line images to suffer from jaggedness and blurring. To overcome this problem, attribute information as described above is produced and used for image processing.

There are also known systems for generating data on a computer or a server functioning as an image-editing apparatus including an image-generating application or word processor software and printing the generated data on an image-forming apparatus. Also in these systems, the image-forming apparatus generates attribute information including text, graphics, and bitmapped images based on the received data. More specifically, when an application passes data to a printer driver, the application specifies an attribute (e.g., text, graphic, or bitmapped image) for each object in the data. Based on this specification, the printer driver generates an attribute command, attaches it to the print data, and sends it to the image-forming apparatus. In the image-forming apparatus, the print data is interpreted and rasterized into bitmapped data to generate an attribute map by using the attribute command. The attribute map represents data indicating attribute information of each pixel in the rasterized image data. By applying predetermined image processing to the data using the generated attribute map, an output product where each area is subjected to optimal image processing is provided. Even if the application specifies no attribute, attribute information can be generated by applying attribute-determination processing to the rasterized image data, as described in Japanese Patent Laid-Open No. 9-284548.

Recently, overall image processing systems also have been introduced where some of the above-described systems are connected via communication networks. Such an image processing system has a function for transmitting image data acquired on an image-reading apparatus to an image-editing apparatus connected thereto via a communication member. Furthermore, the image-editing apparatus has a mechanism for subjecting the transmitted image data to image editing and transferring the edited image data to an image-forming apparatus to print the image data.

In the above-described system, when image data acquired on the image-reading apparatus is transmitted to the image-editing apparatus, no attribute information is transferred to the image-editing apparatus. In general, image data acquired on the image-reading apparatus is produced as an image file in the bitmap format. This bitmapped image file is then transferred to the image-editing apparatus, in which the bitmapped image file is edited. As a result, when an application passes the bitmapped image file to a printer driver as print data, the application specifies the attribute "bitmapped image" for the bitmapped image file. In response, the printer driver generates an attribute command indicating a bitmapped image and sends it to the image-forming apparatus. For this reason, even if the scan image data includes characters or line images, they are assigned the attribute information "bitmapped image" in the attribute map.

To overcome this shortcoming, when bitmapped image data is to be processed in a single image-forming apparatus, it is common that pixels constituting characters and line images in the bitmapped image data are subjected to image processing suitable for characters and line images, thus improving the image quality. Unfortunately, once this bitmapped image data is transmitted to an external image-editing apparatus, the attribute information is ignored. When this bitmapped image data is edited and transmitted to the image-forming apparatus as print data, characters added to the bitmapped image data by the image-editing apparatus are assigned the attribute "text". However, since the original bitmapped image data has the attribute "bitmapped image", characters and line images included in this bitmapped image data are subjected to image processing for the attribute "bitmapped image". Consequently, bitmapped image data that has passed through the image-editing apparatus has often suffered from low image quality, compared with image data that has been processed in a single image-forming apparatus.

It would be possible to transfer attribute. information to the image-editing apparatus together with image data. In this case, if the image data is edited on the image-editing apparatus, the attribute information also needs to be edited. Furthermore, the definition of attribute information generated in the image-forming apparatus may differ from the definition of the attribute command generated by the application via the printer driver. For attribute information generated from scan image data, it is generally determined into which of at least two categories a pixel is classified, namely whether the pixel constitutes a character or a dot. On the other hand, attribute information specified by an application in a computer is often classified into one of text, graphic, and bitmapped image. This is partly because image data manipulated in a computer is based on the idea of "object" of the application. Furthermore, in attribute information generated from an object, the same text may be assigned different attributes depending on the character size. For example, in attribute information generated from an object, different attributes may be specified for a large-size version of a character and a small-size version of the same character. In a structure where attribute information generated in the image-forming apparatus and attribute information generated from an attribute command of print data transmitted from the image-editing apparatus to the image-forming apparatus are both used, it is impossible to determine which attribute information is appropriate information. For example, there may occur a problem such that a pixel identified as a character in attribute information generated from scan data is identified as a bitmapped image in attribute information generated according to an instruction from an application.

As described above, due to differences in the structure or definition of attribute information, it is difficult to perform image processing optimal for each attribute in image data merely by transmitting attribute information to the image-editing apparatus.

SUMMARY OF THE INVENTION

The present invention provides high-quality image data by exploiting image-data attribute information generated from read-out image data even if the read-out image data has been edited in an image-editing apparatus and then has been subjected to image processing in an image-processing apparatus for image formation.

According to one aspect of the present invention, an image processing apparatus for transferring scan image data acquired by a document reader to an editing apparatus and receiving print data based on the scan image data from the editing apparatus to perform image processing includes: a first generator configured to generate first attribute data from the scan image data acquired by the document reader, the first attribute data indicating an image attribute constituting the scan image data; a second generator configured to generate second attribute data based on the print data received from the editing apparatus, the second attribute data indicating an image attribute constituting print image data generated based on the print data; and a third generator configured to generate third attribute data for each of the pixels constituting the print image data based on attribute information of the corresponding pixel in the first attribute data and attribute information of the corresponding pixel in the second attribute data.

According to another aspect of the present invention, a method for controlling an image processing apparatus for transferring scan image data acquired by a document reader to an editing apparatus and receiving print data based on the scan image data from the editing apparatus to perform image processing includes a first generating step of generating first attribute data from the scan image data acquired by the document reader, the first attribute data indicating an image attribute constituting the scan image data; a second generating step of generating second attribute data based on the print data received from the editing apparatus, the second attribute data indicating an image attribute constituting print image data generated based on the print data; and a third generating step of generating third attribute data for each of the pixels constituting the print image data based on attribute information of the corresponding pixel in the first attribute data and attribute information of the corresponding pixel in the second attribute data.

Further features of the present invention will become apparent from the following description of exemplary embodiments (with reference to the attached drawings).

DESCRIPTION OF THE EMBODIMENTS

Numerous embodiments, features and aspects of the present invention will now be described in detail with reference to the drawings.

First Exemplary Embodiment

Figure 1:
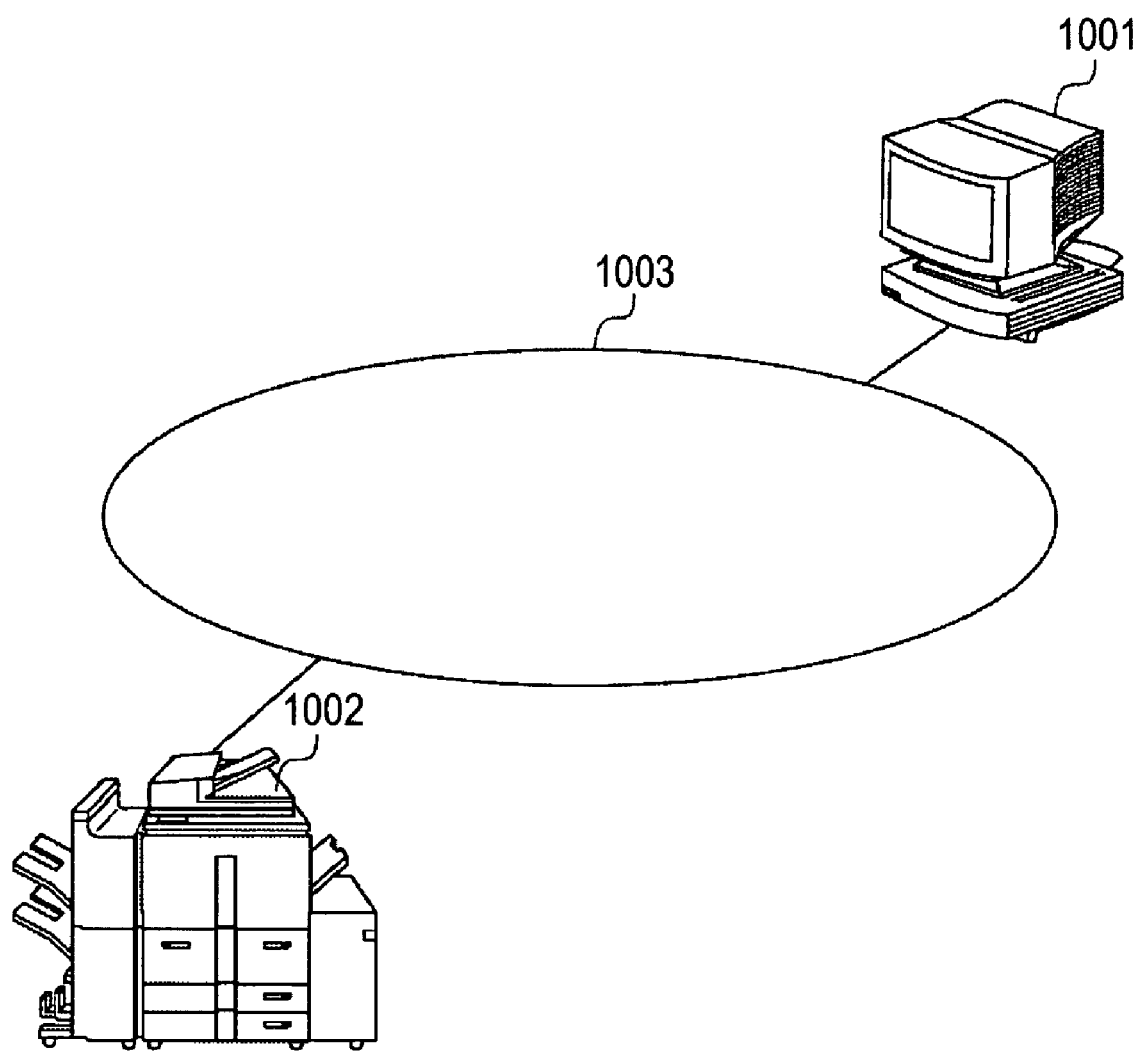
FIG. 1 is a diagram illustrating an exemplary overall system according to the present invention.

FIG. 1 is a diagram illustrating an exemplary architecture of an overall image processing system according to the present invention. Reference numeral 1001 denotes an image-editing apparatus typified by a computer. The image-editing apparatus 1001 is provided with an image editing function, such as application software, for allowing not only original images to be generated but also externally generated image data to be edited and processed.

Reference numeral 1002 denotes an image-forming apparatus which is provided with an image-reading function (scanner apparatus) and capable of carrying out image processing. This image-forming apparatus includes a scanner apparatus and a printer. Furthermore, reference numeral 1003 denotes a communication system for connecting the image-editing apparatus 1001 and the image-forming apparatus 1002. In the following embodiments, this communication system is described as a network system such as a wired LAN or a wireless LAN, but the present invention is not limited to this type of communication system.

Figure 2:
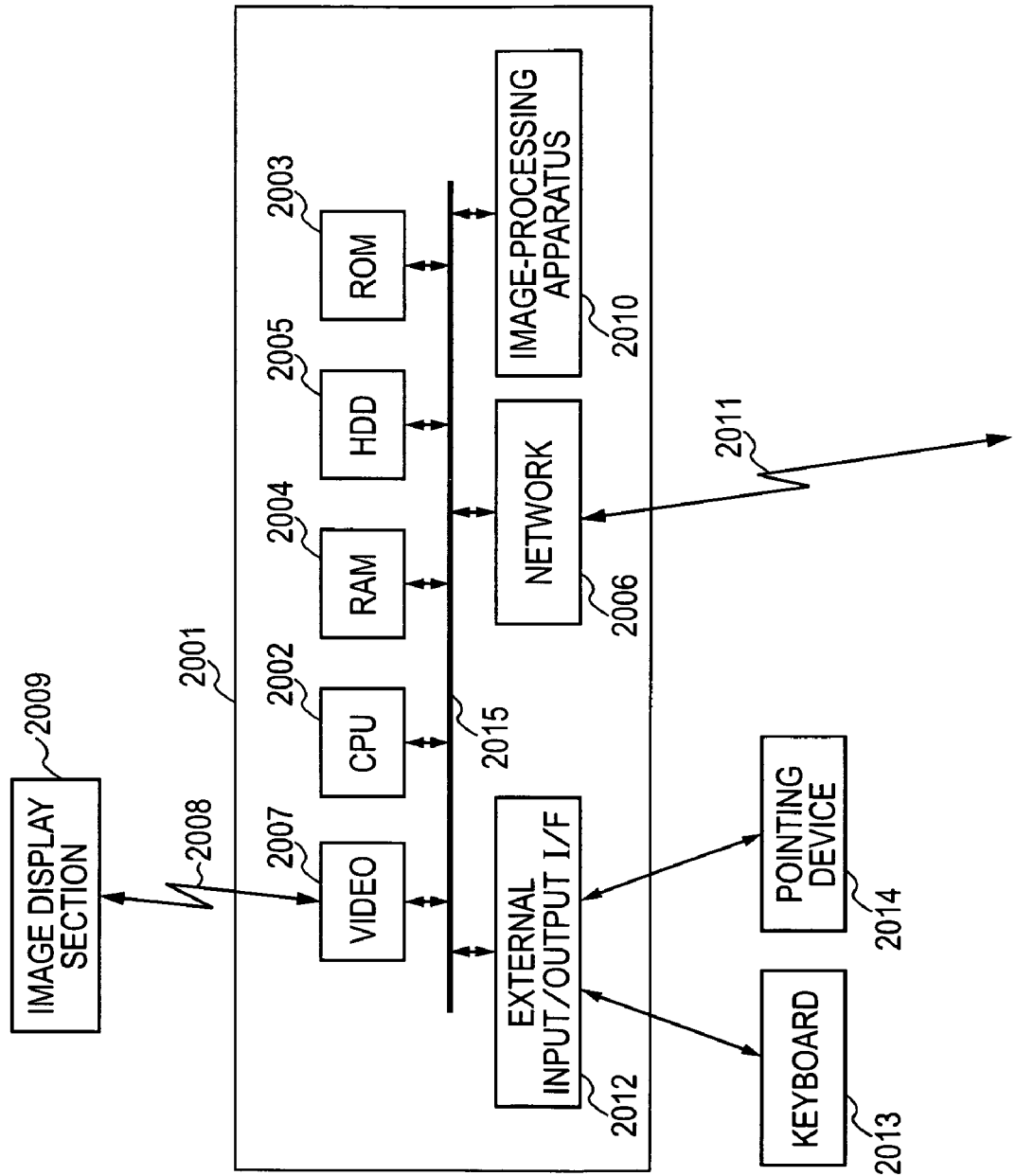
FIG. 2 is a block diagram illustrating an exemplary architecture of an image-editing apparatus according to the present invention.

FIG. 2 is a block diagram illustrating an exemplary architecture of a main controller 2001 provided in the image-editing apparatus 1001. Reference numeral 2001 denotes a block diagram of controller hardware of the image-editing apparatus 1001. Reference numeral 2002 denotes a CPU for executing programs that control the image-editing apparatus 1001. Reference numeral 2003 denotes a ROM storing programs that start up the image-editing apparatus 1001. Reference numeral 2004 denotes a RAM for storing the programs to be executed, that control the image-editing apparatus. Reference numeral 2005 denotes a hard disk, as a secondary storage device, for storing program data that is loaded in the RAM 2004 for execution and data required by an application software program and application software.

Reference numeral 2006 denotes a network communication I/F for carrying out input and output processing of data with the image-forming apparatus 1002 via the communication system 1003. Reference numeral 2007 denotes a video-data transmission section for transmitting image data to an image display apparatus for displaying images and other data formed in the image-editing apparatus 1001. Reference numeral 2008 denotes a cable for transmitting image data to an external image display apparatus from the video-data transmission section. Reference numeral 2009 denotes an image display apparatus for displaying image data received from the video-data transmission section 2007.

Reference numeral 2010 denotes an image-processing apparatus for applying various types of image processing to bitmapped image data received from the network communication apparatus 2006. The image-processing apparatus 2010 is provided with an imposition function for combining, for example, two pages of bitmapped image data into one page of bitmapped image data and a function for digitally correcting and drawing bitmapped image data, such as drawing graphics and text.

Reference numeral 2011 denotes a network cable for receiving image data from an external apparatus and for transmitting data generated in the image-editing apparatus to the external apparatus. The network cable 2011 is connected to the network I/F 2006. Reference numeral 2012 denotes an external device I/F functioning as an interface with external input/output devices. A keyboard 2013 and a pointing device 2014 are connected to the external device I/F 2012. Using the keyboard 2013 and the pointing device 2014, images displayed on the image display apparatus can be edited. And reference numeral 2015 represents the system bus which integrates components 2002 through 2007, 2010, and 2012 together, thereby, allowing intercommunication between these system components.

Figure 3:
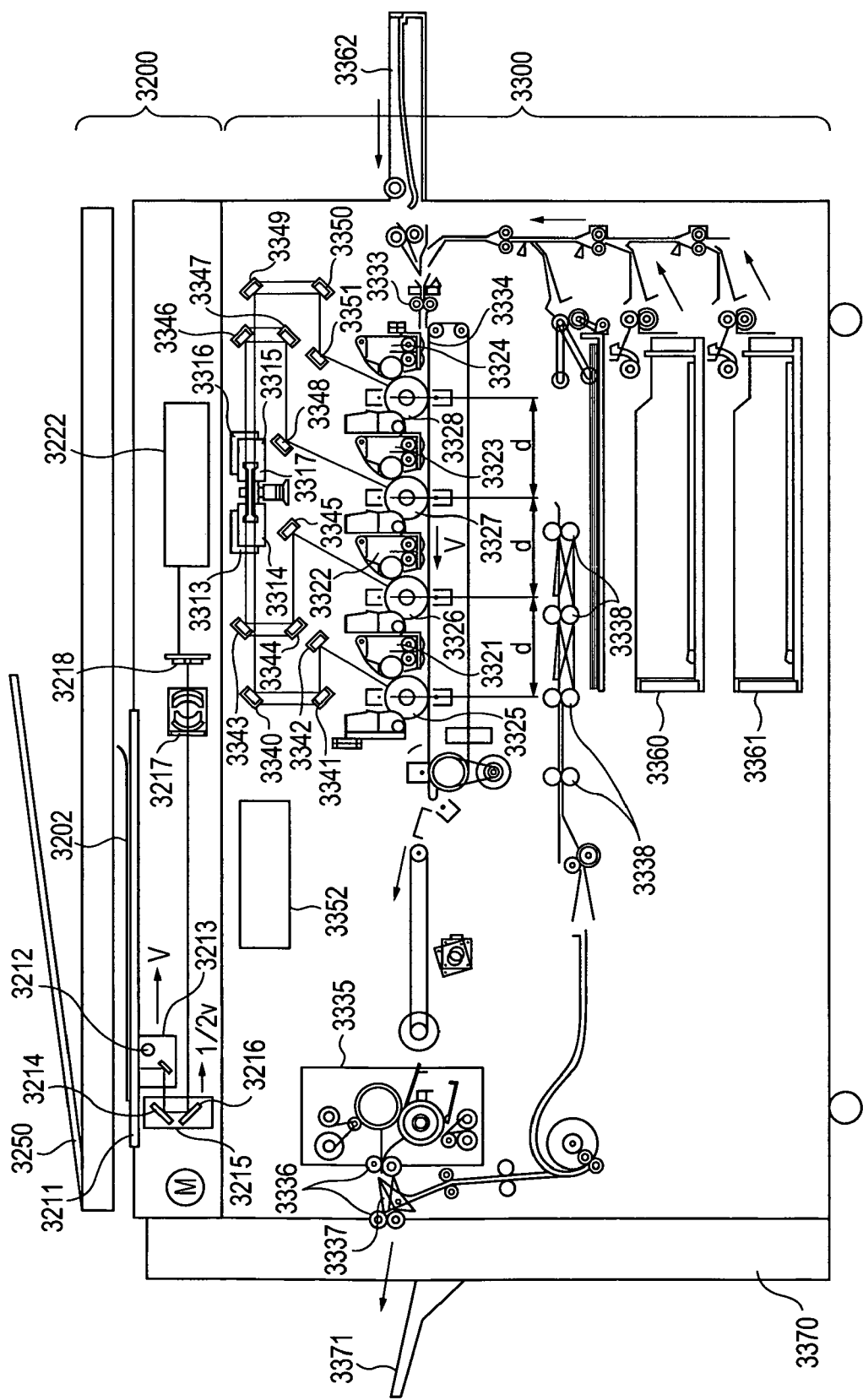
FIG. 3 is a diagram illustrating an exemplary structure of an image-forming apparatus according to the present invention.

FIG. 3 is a diagram illustrating an exemplary structure of the image-forming apparatus 1002. A document-feeding unit 3250 of a reader section 3200 feeds a source document 3202 to a platen glass 3211 one sheet at a time from the top sheet, and after the reading of the source document is completed, ejects the source document on the platen glass 3211. When the source document is transferred onto the platen glass 3211, a lamp 3212 is illuminated and the movement of an optical unit 3213 is started to perform exposure scanning of the source document. Reflected light from the source document at this time is guided to a CCD image sensor (hereinafter, referred to as a CCD) 3218 via mirrors 3214, 3215, and 3216 and a lens 3217. In this manner, an optical signal of the scanned source document is input to the CCD 3218 and converted into an electrical signal.

Reference numeral 3222 denotes a reader-image processing circuit section, which digitally converts the electrical signal output from the CCD 3218 into image data. Furthermore, this image data is subjected to predetermined image processing, and is output to a main controller (not shown in the figure) via a scanner I/F (not shown in the figure). Reference numeral 3352 denotes a printer-image processing circuit section, which outputs to a laser driver the image signal sent from the main controller via a printer I/F (not shown in the figure). The laser driver 3317 of the printer section 3300 is a driving section that drives laser-emitting sections 3313, 3314, 3315, and 3316. Laser beams according to image data output from the printer-image processing section 3352 are emitted from the laser-emitting sections 3313, 3314, 3315, and 3316. The laser beams are emitted onto photoconductor drums 3325, 3326, 3327, and 3328 by mirrors 3340, 3341, 3342, 3343, 3344, 3345, 3346, 3347, 3348, 3349, 3350, and 3351. On the photoconductor drums 3325, 3326, 3327, and 3328 are formed latent images according to the emitted laser beams. Reference numerals 3321, 3322, 3323, and 3324 denote developing units for developing latent images with black (Bk), yellow (Y), cyan (C), and magenta (M) toners, respectively. The toner of each color developed by the corresponding developing unit is transferred to a sheet of paper for full-color printing.

A sheet of paper fed by one of the sheet cassettes 3360 and 3361 and a manual-feed tray 3362 with timings in synchronization with the start of emission of laser beams is absorbed on a conveyor belt 3334 via a register roller 3333 and is then transported. Developer adhered on the photoconductor drums 3325, 3326, 3327, and 3328 is transferred to the recording sheet. The recording sheet to which the developer has been transferred is transported to a fusing unit 3335 and the developer is fused on the recording sheet by heat and pressure of the fusing unit 3335. The recording sheet that has passed through the fusing unit 3335 is transferred to a paper-eject unit 3370 by eject rollers 3336. In the paper-eject unit 3370, the recording sheets are bundled for sorting or the sorted recording sheets are stapled. Finally, the recording sheets are ejected to a paper output tray 3371.

Furthermore, if double-sided recording is set, the recording sheets are guided to a paper-refeeding path 3338 by a flapper 3337. The recording sheets guided to the paper-refeeding path 3338 are fed to the conveyor belt 3334 with the above-described timings.

Figure 4:
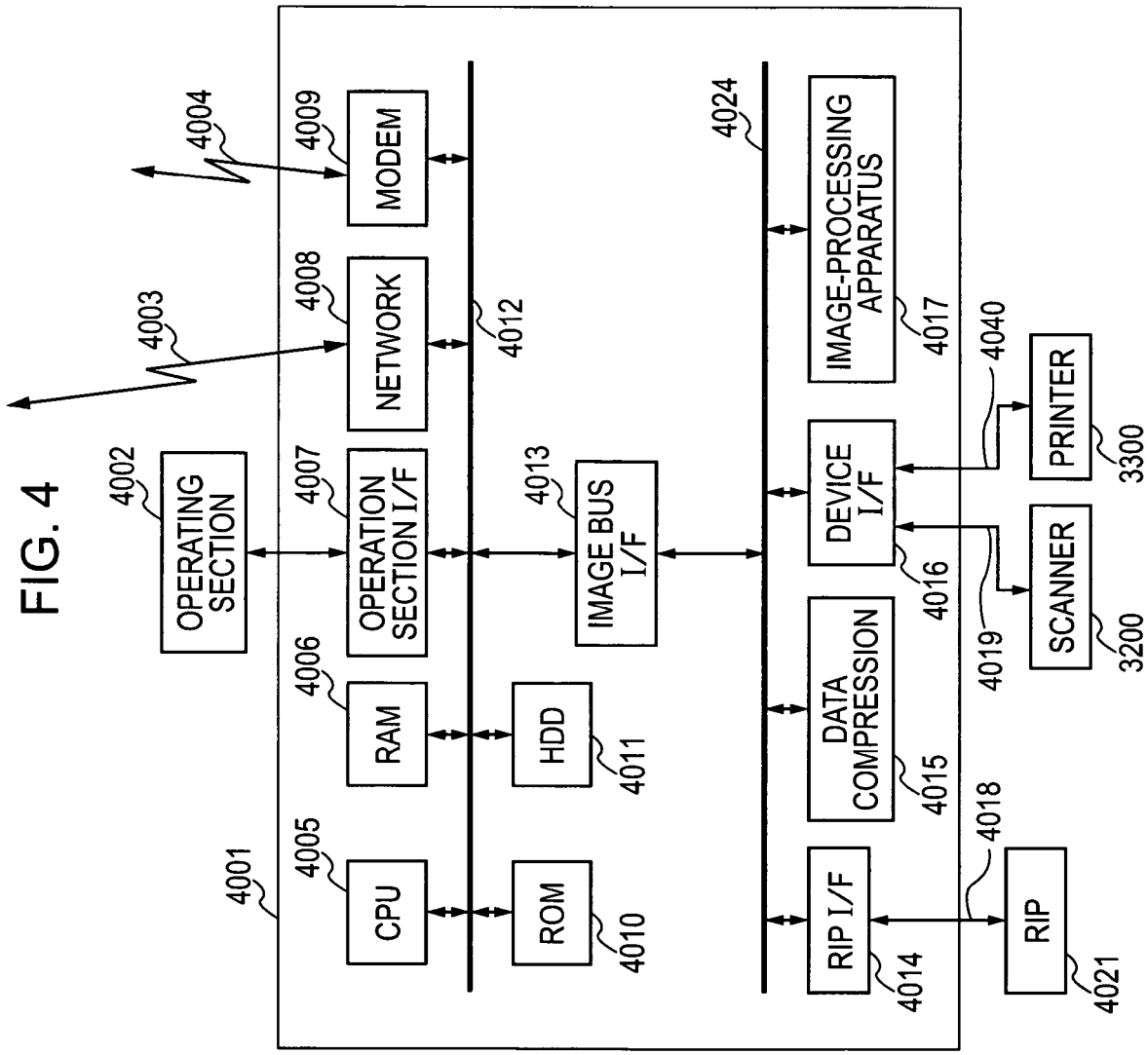
FIG. 4 is a block diagram illustrating an exemplary architecture of a control part of the image-forming apparatus according to the present invention.

FIG. 4 is a block diagram illustrating an exemplary architecture of a main controller 4001 provided in the image-forming apparatus 1002. The main controller 4001 carries out various types of control of the image-forming apparatus 1002. Reference numeral 4002 denotes an operating section for operating devices. Reference numeral 4003 denotes a network cable for connection to an external device via a network (the communication system 1003). Reference numeral 4004 denotes a line cable for connection to an external device via a telephone line. Reference numeral 4005 denotes a CPU for executing programs that control the controller 4001. Reference numeral 4006 denotes a RAM for storing programs to be executed by the CPU 4005. The RAM 4006 is used, for example, as a reception buffer for temporarily storing externally received data or an image data buffer for temporarily storing image data rasterized by a RIP section 4021.

Reference numeral 4007 denotes an operation section interface for connecting the operating section 4002 and the controller 4001. Reference numeral 4008 denotes a network interface for connecting the controller 4001 and the network. Reference numeral 4009 denotes a line interface for connecting the controller 4001 and the telephone line. Reference numeral 4010 denotes a ROM for storing, for example, programs executed by the CPU 4005 and data. Reference numeral 4011 denotes a hard disk, as an exemplary nonvolatile storage device, capable of saving various types of data. Reference numeral 4012 denotes a CPU bus.

Reference numeral 4024 denotes an image bus connected to hardware devices for image processing. Reference numeral 4013 denotes an image bus interface for connecting the CPU bus 4012 and the image bus 4024. Reference numeral 4021 denotes a rasterizing board having a function for converting page description language (PDL) data input from, for example, an external computer into bitmapped image data. This rasterizing board is also referred to as a RIP section. Reference numeral 4014 denotes a RIP interface for connecting the RIP section 4021 and the image bus 4024 via an image-transfer bus 4018. Reference numeral 4015 denotes a data-compressing apparatus for compressing data.

Reference numeral 4016 denotes a device interface for connecting a scanner 3200 and a printer 3300 to the image bus 4024 via data buses 4019 and 4040. Reference numeral 4017 denotes an image-processing apparatus for applying various types of image processing to bitmapped image data generated by the scanner unit 3200 and the RIP 4021. The image-processing apparatus 4017 is provided with a function for digitally correcting and drawing bitmapped image data, such as an imposition function, and a function for adding text to image data and drawing graphics.

Figure 5:
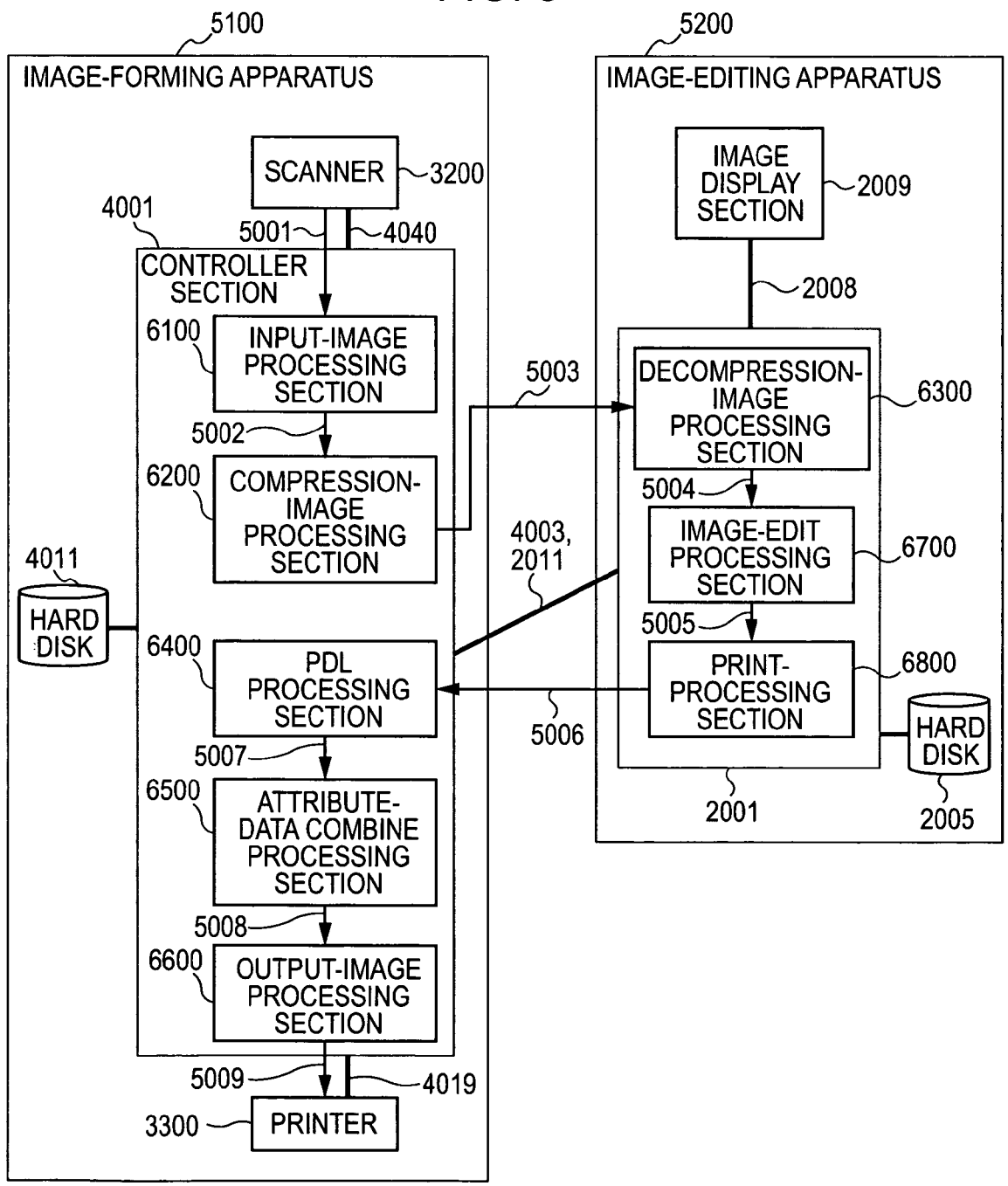
FIG. 5 is a diagram illustrating an exemplary image data processing flow according to the present invention.

FIG. 5 is a block diagram illustrating an exemplary first image data flow in the image processing system according to the present invention. Reference numeral 5100 denotes a block diagram schematically illustrating the structure of the image-forming apparatus according to the present invention. The image-forming apparatus 5100 includes the scanner apparatus 3200, the printer 3300, and the main controller 4001 for controlling the scanner apparatus 3200 and the printer 3300. The hard disk 4011, as a storage device, for storing image data and other data is connected to the main controller 4001.

Reference numeral 5200 denotes a block diagram schematically illustrating an exemplary architecture of the image-editing apparatus shown in FIG. 1. As shown in FIG. 2, the image-editing apparatus 5200 includes the main controller 2001 and the display section 2009 for displaying image data received from the image-forming apparatus 5100 and allowing the operator to perform image editing. The hard disk 2005, as a storage device, for storing image data is connected to the main controller 2001. The image-forming apparatus 5100 and the image-editing apparatus 5200 are connected via the connection cable 4003 and 2011 to send and receive image data to and from each other.

Arrows 5001 to 5009 shown in FIG. 5 schematically indicate an image data flow. According to the first image data flow of the present invention, an operator's instruction initiates the reading of a source document on the scanner 3200 provided in the image-forming apparatus 5100, and then the read-out optical signal is converted into image data and transmitted to the main controller 4001 (as indicated by the arrow 5001).

In the main controller 4001, image processing is performed by an input-image processing section 6100 in the main controller 4001, and data is passed to a compression-image processing section 6200 (as indicated by the arrow 5002). This input-image processing section 6100 generates attribute data (attribute information) indicating the attribute of each pixel in the image data. Details of the input-image processing section 6100 (first generator) will be described later.

In the compression-image processing section 6200, image data and attribute data subjected to image processing in the input-image processing section 6100 are compressed (encoded). Then, the image data and attribute data are stored in the hard disk 4011. Furthermore, the main controller 4001 transmits the image data and attribute data to the image-editing apparatus 5200 via the network 4003/2011 (as indicated by the arrow 5003). In this embodiment, image data and attribute data to be transferred to the image-editing apparatus 5200 are compressed. However, non-compressed data can also be transmitted in the present invention.

In the image-editing apparatus 5200, the image data and attribute data input to the main controller 2001 via the network 4003/2011 are stored in the hard disk 2005 connected to the main controller 2001. In order to display the stored image data on the image display section 2009 and carry out image editing of the stored image data, decompression (decoding) of the image data is carried out in a decompression-image processing section 6300. The decompressed image data is passed to an image-edit processing section 6700 (as indicated by the arrow 5004). The image-edit processing section 6700 displays the input image data in the image display section 2009, and carries out image editing based on an editing instruction input by the operator via an application. Although described later in detail, the attribute data is also edited depending on the type of image editing.

When the operator issues an instruction for starting image printing of the image data that has been subjected to image editing, the image data and attribute data are passed to a print-processing section 6800 (as indicated by the arrow 5005). This print-processing section 6800 corresponds to a print module including a printer driver provided in a computer functioning as the image-editing apparatus. The print-processing section 6800 converts the image data passed from the image-edit processing section 6700 and attribute data stored in the hard disk into print data (a PDL job) expressed in, for example, a page description language. This print data is transmitted to the image-forming apparatus via the network 4003/2011 (as indicated by the arrow 5006). Alternatively, a structure such that the image data subjected to image editing is first stored in the hard disk 2005 and then the stored image data is read out and transmitted to the print-processing section is also acceptable.

A PDL processing section 6400 (second generator) that has received the print data in the image-forming apparatus 5100 converts the input print data (PDL job) into image data and attribute data, and further generates new attribute data. The PDL processing section 6400 carries out the processing of interpreting the PDL and commands of the PDL job to convert (rasterize) the PDL job into image data and the processing of generating an attribute map based on the image data edited in the image-editing apparatus. In the following description, it is assumed that the attribute data generated based on the image data acquired on the scanner apparatus is scan attribute data (first attribute data) for the sake of simplicity. Furthermore, it is assumed that the attribute data generated newly in the PDL processing section by receiving the print data transmitted from the image-editing apparatus is PDL attribute data (second attribute data).

In more detail, the attribute data transmitted to the image-editing apparatus 5200 together with image data, as indicated by the arrow 5003, is scan attribute data. Furthermore, the attribute data transmitted as a print job together with the image data edited in the image-editing apparatus 5200, as indicated by the arrow 5006, is also scan attribute data. On the other hand, the attribute data newly generated by interpreting the print job in the PDL processing section 6400 is PDL attribute data. In this embodiment, the scan attribute data is transmitted to the image-editing apparatus 5200 because, as described later, editing image data in the image-editing apparatus 5200 may also cause the necessity for editing the scan attribute data.

In addition, regardless of whether the scan attribute data has been edited or not, the re-association of the image data edited in the image-editing apparatus 5200 and sent back to the image-forming apparatus 5100 with the corresponding scan attribute data stored in the hard disk 4011 of the image-forming apparatus 5100 would be complicated. For this reason, in this embodiment, regardless of whether the scan attribute data is edited or not, the scan attribute data as well as image data are transmitted to the image-editing apparatus 5200. In addition, the present embodiment includes a procedure for returning the scan attribute data to the image-forming apparatus 5100 together with the image data edited in the image-editing apparatus 5200. In the present invention, however, it is not always necessary to adopt a structure for transmitting and returning scan attribute data to the image-editing apparatus 5200.

Further, it is noted that the PDL attribute data generated in the PDL processing section 6400 and the scan attribute data produced based on the print job are transmitted to an attribute-data combine processing section 6500 (as indicated by the arrow 5007).

The attribute-data combine processing section 6500 (third generator) combines the first attribute data (scan attribute data) transmitted from the image-editing apparatus 5200 and the second attribute data (PDL attribute data) generated by the PDL section 6400 into combined attribute data (third attribute data). The combined attribute data and the image data produced by the PDL processing section 6400 are transmitted to an output-image processing section 6600 (as indicated by the arrow 5008). In the output-image processing section 6600, image processing is applied to the image data using the combined attribute data and print data is transmitted to the printer 3300 (as indicated by the arrow 5009). In the printer 3300, print processing of the input print data is carried out.

Figure 6:
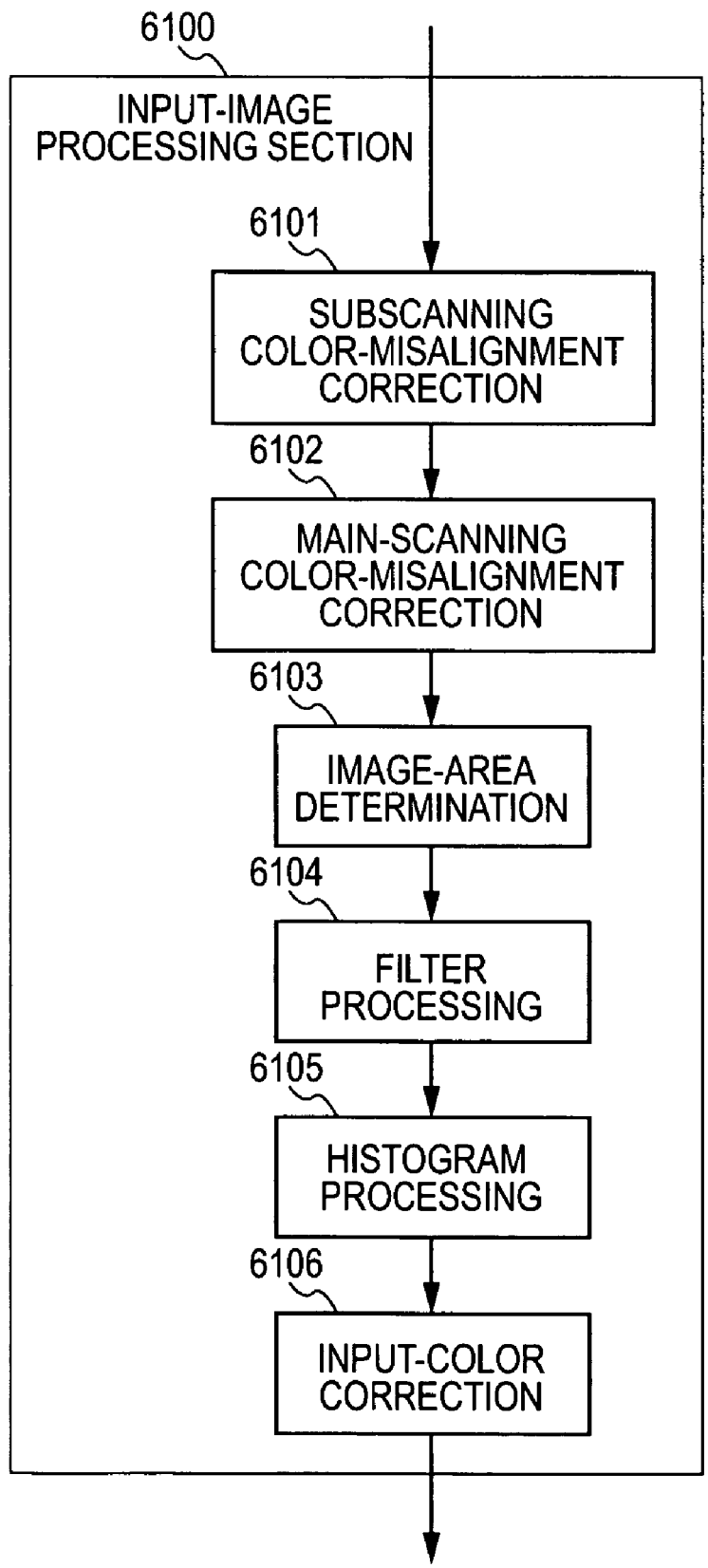
FIG. 6 is a block diagram illustrating an exemplary architecture of the input-image processing section shown in FIG. 5 according to the present invention.

An exemplary architecture of the input-image processing section 6100 shown in FIG. 5 will now be described in detail with reference to FIG. 6. Referring to FIG. 6, a sub-scanning color-misalignment correcting section 6101 carries out the processing of correcting color misalignment in the sub-scanning direction of the input image. For this correction processing, for example, a technique for performing 1×5-matrix operation on each color of the image data is used. A main-scanning color-misalignment correcting section 6102 carries out the processing of correcting color misalignment in the main-scanning direction of the input image. For this correction processing, for example, a technique for performing 5×1-matrix operation on each color of the image data is used.

An image-area determining section 6103 carries out the determination processing of identifying image types in the image data input from the scanner 3200. The image-area determining section 6103 identifies the image type, such as a photography part, a character part, a chromatic part, and an achromatic part, of each pixel in the input image, and then generates and outputs scan attribute data indicating the image type on a pixel by pixel basis.

A filter-processing section 6104 carries out the processing of freely correcting the spatial frequency of the input image. This correction processing performs arithmetic operations of, for example, a 9×9-matrix coefficient and pixel values. A histogram-processing section 6105 is a processing section for sampling the histogram of the image data. In this sampling processing, it is determined whether the image data is a color image or a monochrome image and the background level of the image data is determined. An input-color correction section 6106 carries out the processing of correcting the tint of the image data. In this correction processing, for example, the color space of the input image is converted to any color space, and correction processing related to the tint of the input system is also carried out. In the aforedescribed manner, the image data subjected to the above-described processing in the input-image processing section 6100 and the scan attribute data generated in the image-area determining section 6103 are transmitted to the compression-image processing section 6200.

Next, the image data processed in the input-image processing section 6100 and scan attribute data generated in the image-area determining section 6103 are transferred to the compression-image processing section 6200. It is noted, however, that the structure of the input-image processing section 6100 is not limited to the above-described structure. Furthermore, the processing order in the input-image processing section 6100 is not limited to the above-described order.

Figure 7:
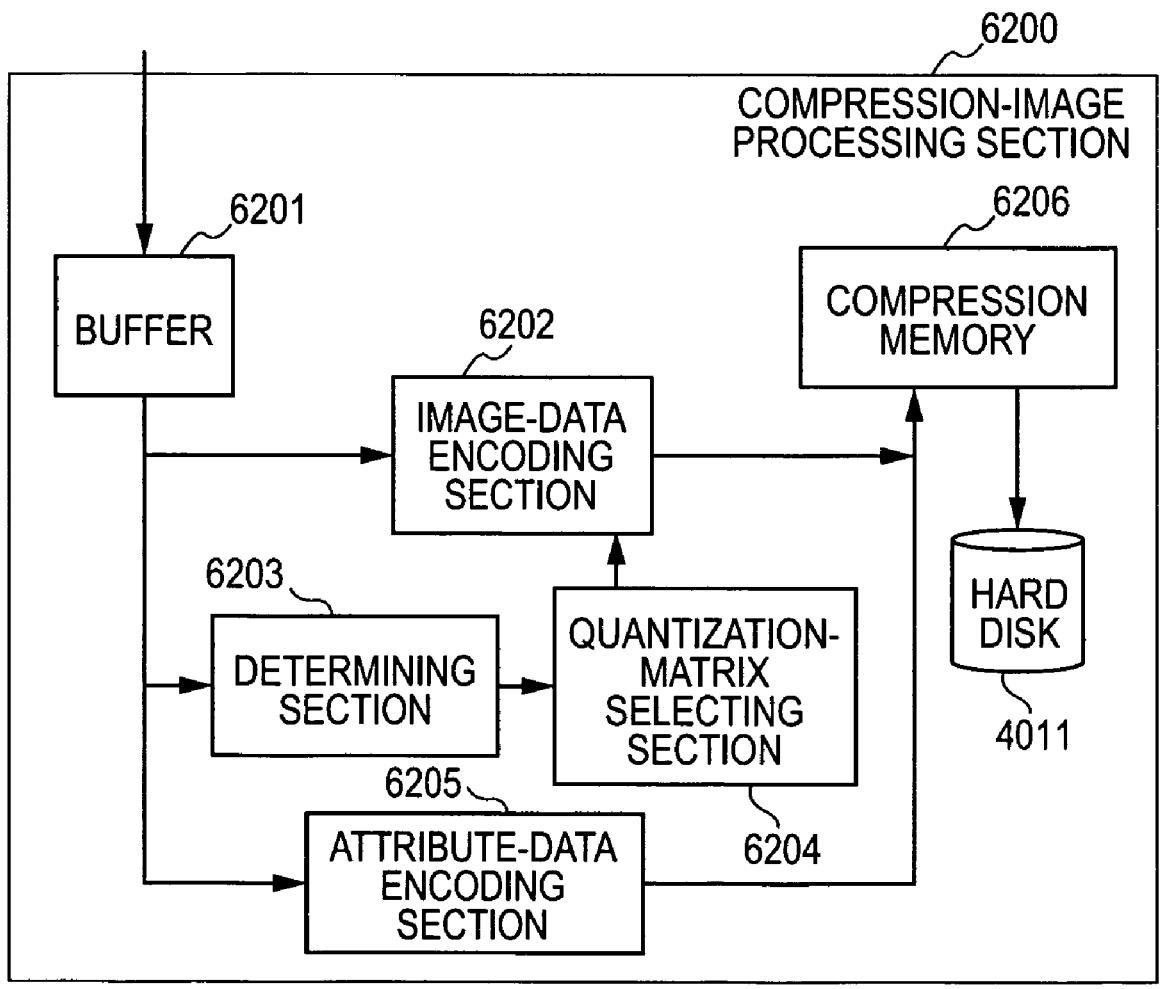
FIG. 7 is a block diagram illustrating an exemplary architecture of the compression-image processing section in FIG. 5 according to the present invention.

An exemplary architecture of the compression-image processing section 6200 shown in FIG. 5 will now be described in detail with reference to FIG. 7. The image data that has been processed by the input-image processing section 6100 is transferred to the compression-image processing section 6200 together with scan attribute data, and is further processed in the following processing sections. In this compression-image processing section, the image data and the scan attribute data are divided into tile images each composed of M×N pixels. The image data is subjected to color information encoding, more specifically, discrete cosine transformation encoding (JPEG compression), one tile of M×N pixels at a time. Furthermore, the scan attribute data is subjected to run-length encoding.

Here, M and N need to be multiples of the window size for discrete cosine transformation encoding. This embodiment is described by way of the JPEG compression technique. In the JPEG compression technique, the window size for compression is 8×8 pixels. In the case of, for example, M=N=32, a tile of 32×32 pixels is further divided into 16 sub-images each composed of 8×8 pixels, and JPEG compression is applied to each of the 8×8-pixel sub-images. Although the following description assumes M=N=32, the present invention is not limited to this window size.

Reference numeral 6201 denotes a buffer for temporarily storing the image data and the scan attribute data. It does not matter whether division into above-described tile images is performed before or after the image data and the scan attribute data are stored in the buffer 6201. An image-data encoding section 6202 applies known discrete cosine transformation (DCT) to the sixteen 8×8-pixel windows included in the tile image of 32×32 pixels for quantization. Different quantization coefficients (referred to as quantization matrices) can be used for different tiles for this processing.

A determining section 6203 makes a determination for switching the above-described quantization matrix by referring to the scan attribute data of 32×32 pixels corresponding to the predetermined image data of 32×32 pixels. A quantization-matrix selecting section 6204 selects a quantization matrix used for quantization by the image-data encoding section 6202 based on the determination result by the determining section 6203, and set the selected quantization matrix in the image-data encoding section 6202.

For example, if at least one pixel in the scan attribute data of 32×32 pixels includes attribute information indicating a character, this image data composed of 32×32 pixels is determined as a character tile-image, and hence, is subjected to quantization using a quantization matrix for characters. In addition, if the scan attribute data includes no attribute information indicating a character, this image data is determined as a photography tile, and hence, is subjected to quantization using a quantization matrix for photographs. In this manner, different image data encoding operations can be applied to different tiles.

An attribute-data encoding section 6205 encodes the scan attribute data. A compression memory 6206 temporarily stores the encoded image data and scan attribute data. The temporarily stored compression image data and the compression scan attribute data are eventually stored in the hard disk 4011.

Figure 8:
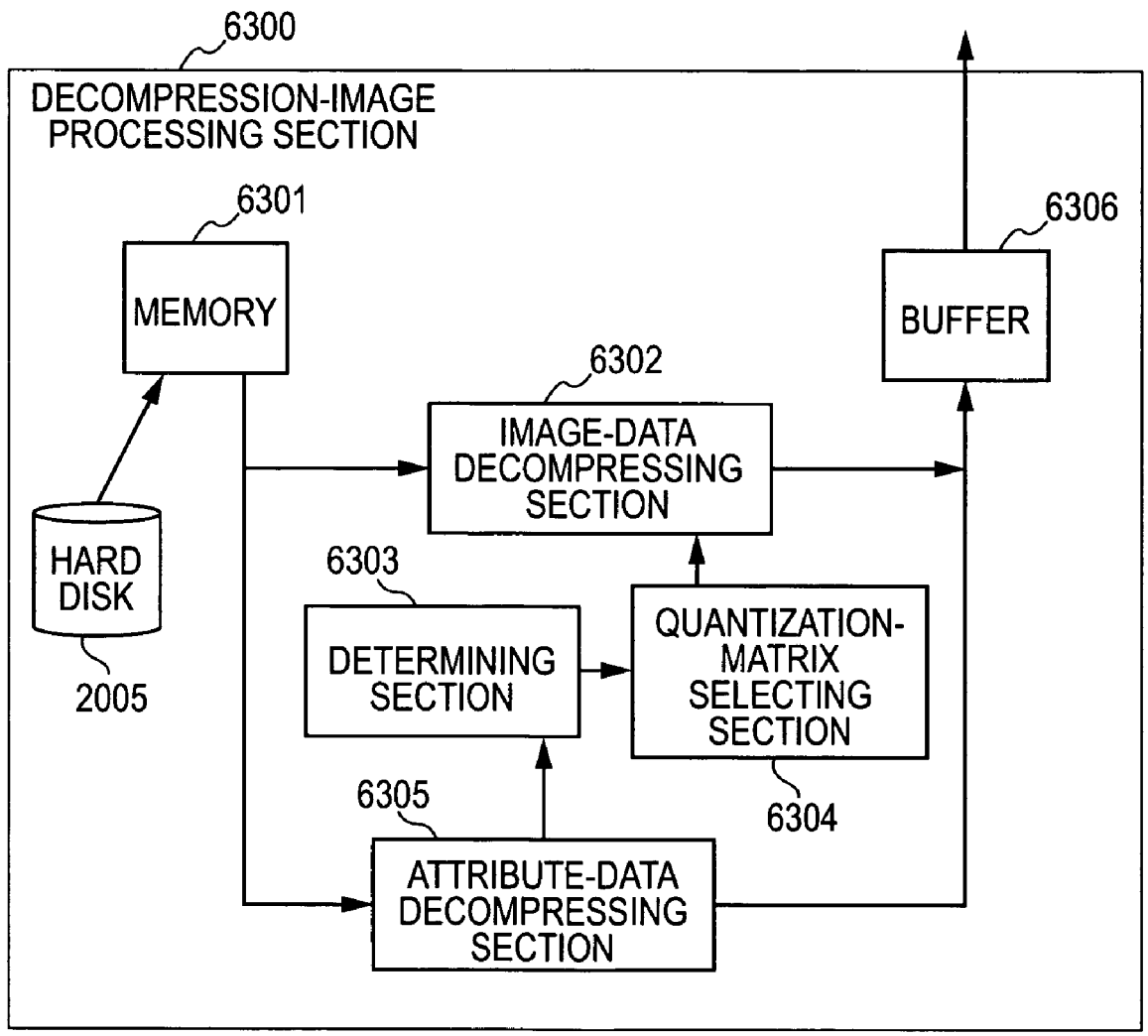
FIG. 8 is a block diagram illustrating an exemplary architecture of the decompression-image processing section in FIG. 5 according to the present invention.

An exemplary architecture of the decompression-image processing section 6300 provided in the image-editing apparatus will now be described in detail with reference to the block diagram shown in FIG. 8. Reference numeral 6301 denotes a memory, which reads out compression image data from the hard disk 2005 and stores the compression image data therein. The read-out image data is subjected to the processing described below to decompress (decodes) the compression image data. As described above, the scan image data and the scan attribute data are transmitted from the image-forming apparatus 5100 to the image-editing apparatus and are then stored in the hard disk 2005.

An attribute-data decompressing section 6305 decompresses M×N pixels of data in the scan attribute data transmitted from the image-forming apparatus 5100. From the decompressed attribute data, a determining section 6303 performs attribute-determination processing on M×N pixels of image data corresponding to this scan attribute data. Here, it is determined whether each tile image is a character tile or a photography tile from the scan attribute data. Based on this determination result, a quantization matrix used for decompression processing of the image data in the image-data decompressing section 6302 is selected. For this purpose, the determination result by the determining section 6303 is input to a quantization-matrix selecting section 6304. The quantization-matrix selecting section 6304 selects a decoding coefficient for each tile in response to a command from the determining section 6303, and sends it to an image-data decompressing section 6302 described below.

The image-data decompressing section 6302 switches among the coefficients for tiles according to the quantization coefficient from the quantization-matrix selecting section 6304 to decompress (decode) the image data. A buffer 6306 temporarily stores the image data decompressed in the image-data decompressing section 6302 and the attribute data decompressed in the attribute-data decompressing section 6305.

In the determining sections 6203 and 6303, the exactly same determination is performed. The scan attribute data is compressed by a lossless compression technique, such as the run-length encoding technique, where data loss does not occur. This means that the determination results corresponding to the same tile are the same between encoding and decoding. Therefore, despite quantization with different quantization coefficients for different tiles, a dequantization coefficient appropriate for each tile is set for decoding, ensuring correct decoded image data. It is noted that the structures of the compression-image processing section 6200 and the decompression-image processing section 6300 are not limited to those described above.

Figure 9:
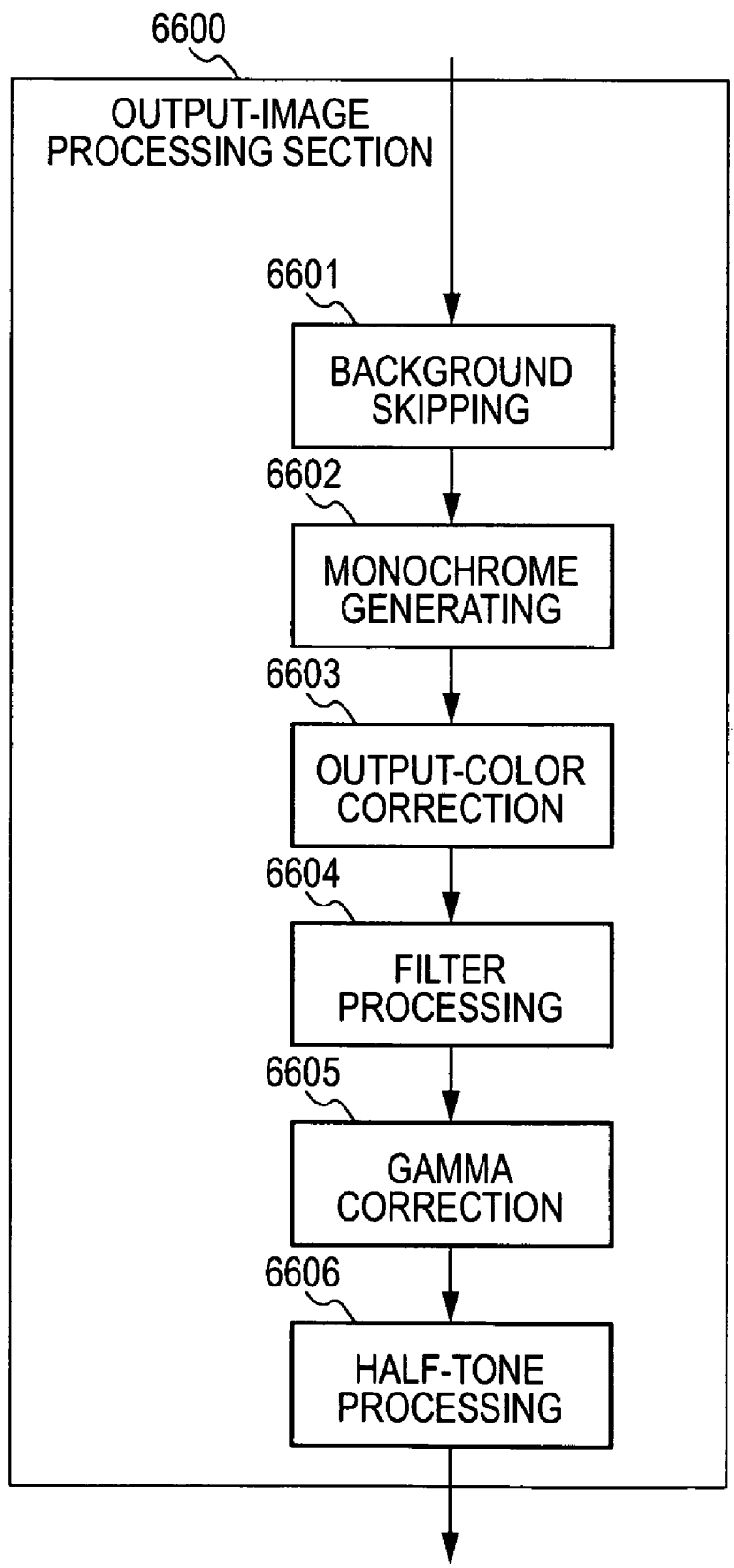
FIG. 9 is a block diagram illustrating an exemplary architecture of the output-image processing section in FIG. 5 according to the present invention.

An exemplary architecture of the output-image processing section 6600 shown in FIG. 5 will now be described with reference to the block diagram shown in FIG. 9. A background-skipping section 6601 skips the background color of the image data to perform the correction of eliminating fog on the background. In this correction processing, background skipping is carried out using 3×8-matrix operations or one-dimensional LUT (lookup table) based on the histogram generated by the histogram-processing section 6105. A monochrome-generating section 6602 carries out the processing of converting the color image data into monochrome data. In this processing, color image data, such as RGB data, is converted into gray monochrome data. This processing includes, for example, a 1×3 matrix operation for multiplying each value of RGB by any constant to convert it into a gray signal.

An output-color correction section 6603 performs color correction according to the characteristics of the printer section 3300 for outputting the image data. This correction processing includes, for example, a 4×8-matrix operation and direct mapping processing. A filter-processing section 6604 carries out the processing of freely correcting the spatial frequency of the image data. This correction processing include, for example, 9×9-matrix operation processing.

A gamma correction section 6605 carries out gamma correction according to the characteristics of the printer section 3300 for data output, and typically includes a one-dimensional LUT. A half-tone processing section 6606 is a processing section for carrying out any half-tone processing according to the number of gray levels of the printer section 3300 for data output, and converts image data of 8 bits (256 gray levels) into image data of 1 bit (two gray levels) or into image data of 2 bits (four gray levels). This conversion processing is realized by, for example, dither matrix processing or error diffusion processing.

The descriptions of the exemplary input-image processing section 6100, the exemplary compression-image processing section 6200, the exemplary decompression-image processing section 6300, and the exemplary output-image processing section 6600 have been completed with reference to FIGS. 6 to 9. The scan attribute data generated in the image-area determining section 6103 for identifying image types in the input image described with reference to FIG. 6 or the combined attribute data generated in the attribute-data combine processing section 6500 is transmitted together with image data through each of the above-described image processing sections. According to one of the scan attribute data and the combined attribute data, image processing with a processing coefficient optimal for each image area is applied to the image data. In this manner, processing optimal for each image area is carried out according to the attribute data by each processing module to achieve high-quality images.

Figure 10:
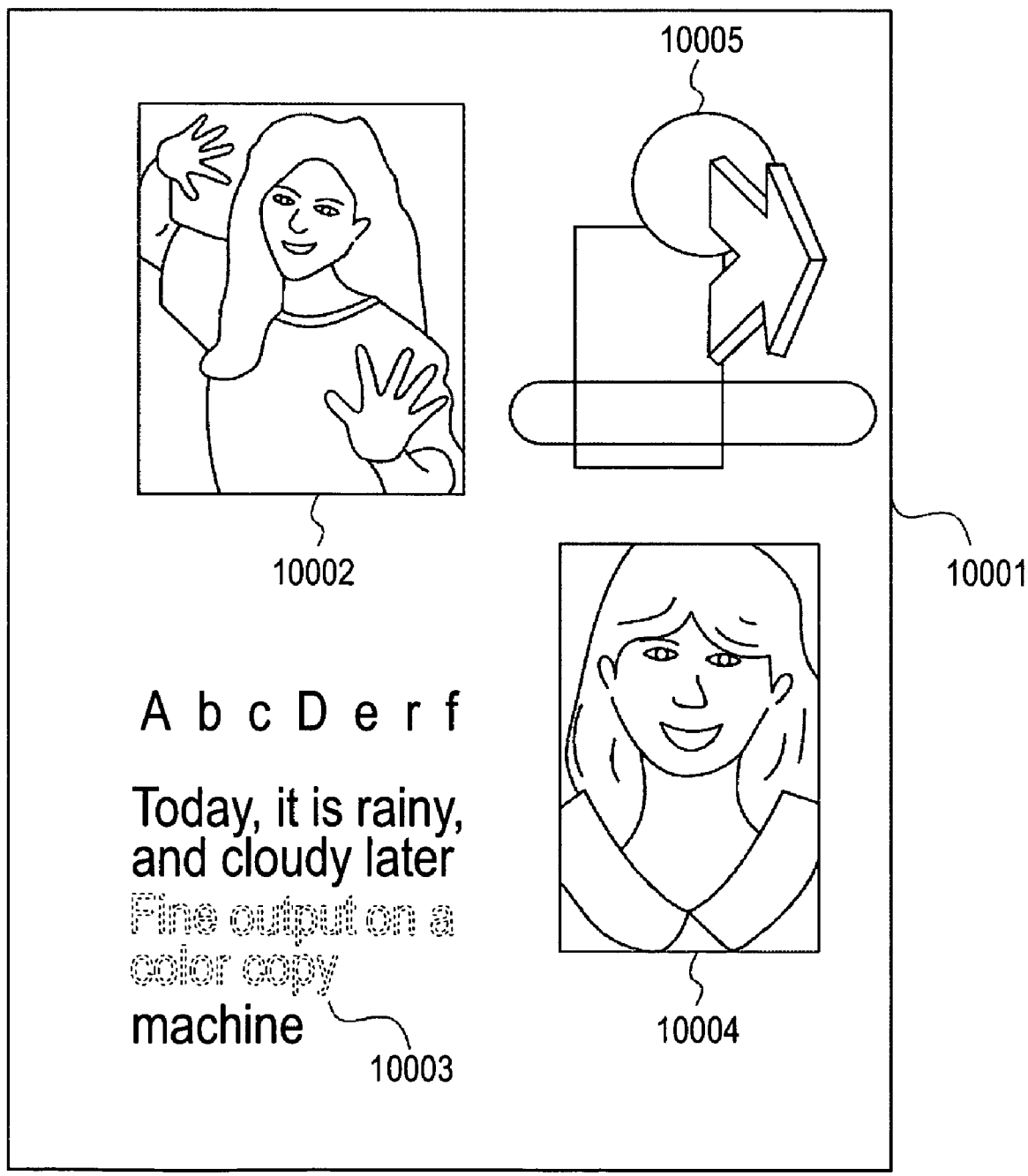
FIG. 10 is a diagram for illustrating an exemplary procedure for generating first attribute flag data according to the present invention.

A detailed exemplary procedure for generating scan attribute data used to detect and identify each image data attribute included in the above-described input image data will be described below. FIG. 10 is a diagram for illustrating a procedure for generating scan attribute data. Reference numeral 10001 denotes one example of input source document image data (scan image data). This source document image data 10001 includes a silver-halide photograph area 10002, a black character area 10003, a dot print area 10004, and a color graphic area 10005.

The scanner section scans this source document image with a color CCD sensor to read the source document as color digital image data (R, G, and B) on a pixel by pixel basis. The read-out RGB signals exhibit a characteristic according to the attribute of each area in the image. Plotting the G signal among the signal values (R, G, and B) read-out by the CCD sensor in the CCD arrangement direction in each area causes results as shown in, for example, FIGS. 11A to 11D.

FIGS. 11A to 11D are diagrams illustrating characteristics of the read-out signal values obtained by reading image attributes with the CCD sensor. FIGS. 11A, 11B, 11C, and 11D are examples of respective distinctive characteristics exhibited when the areas 10002 to 10005 shown in FIG. 10 are read out. The horizontal axis of each graph in FIGS. 11A to 11D represents the pixel position in the CCD arrangement direction, and the vertical axis represents the read-out signal value, where the larger the value, the whiter (brighter) the pixel.

Figure 11:
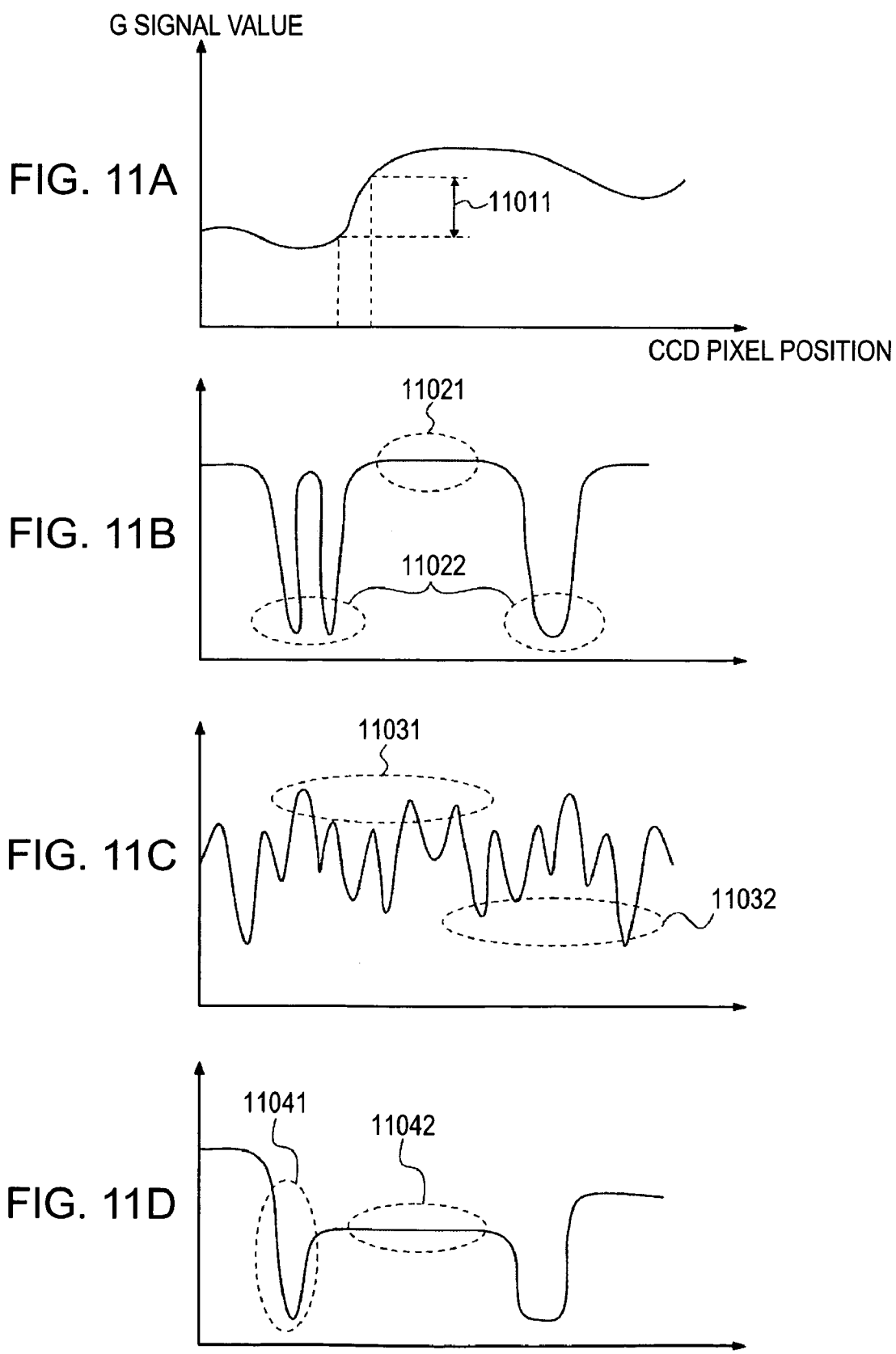
FIGS. 11A to 11D are diagrams illustrating the characteristics of read-out signal values when a CCD sensor reads out image attributes according to the present invention.

The characteristics of the areas shown in FIGS. 11A to 11D can be described as follows. FIG. 11A corresponds to the silver-halide photograph area 10002, where a change according to the position of the read-out image signal is relatively gentle and hence a difference 11011 between pixel values at a near distance is small. FIG. 11B corresponds to the black character area 10003, where black characters are printed on a white background and hence plotting the signal value produces a characteristic such that the read-out signal value sharply changes from a white background part 11021 to a character region 11022. FIG. 11C corresponds to the dot area 10004, where the dot area is composed of repeated dots 11032 printed on a white background 11031, and hence, exhibits a characteristic such that the signal value causes bright pixels and dark pixels repeated at a high frequency, as shown in the figure. FIG. 11D represents a plot of the graphic area. The signal value sharply decreases in an edge 11041 of the graphic and a certain intermediate level continues in an internal color-filling part 11042.

To determine these attributes, a signal value exhibiting the characteristic of each of the above-described areas is used. For this purpose, a known feature extraction technique, such as the amount of change in image data near the pixel of interest, an integrated value of the amount of change in a particular segment, a luminance value (whether white background or color background) of surrounding pixels, and the number of times of a change from white to black in a particular segment of the image data, is used. Then, a known attribute determination technique is adopted based on the extracted characteristic value.

Figure 12:
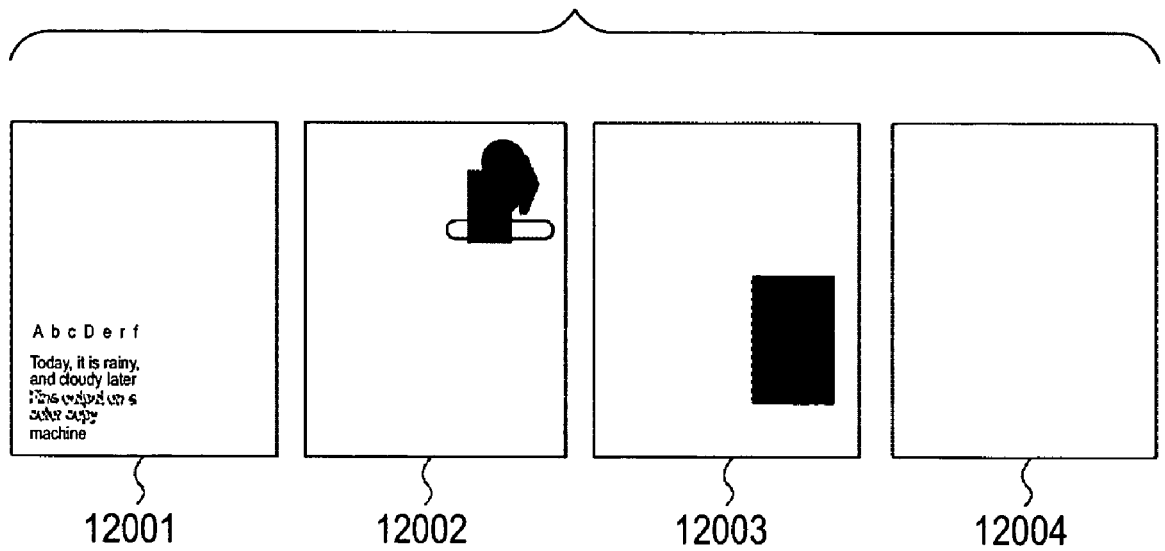
FIG. 12 is a diagram illustrating one example of attribute flag data of the input image shown in FIG. 10 according to the present invention.

FIG. 12 is a diagram illustrating an example of scan attribute data of the input image 10001 shown in FIG. 10. In the example shown in FIG. 12, three types of flags: character flag, graphic flag, and dot flag are generated as scan attribute data. It goes without saying that the present invention is not limited to these three types of flags. Reference numeral 12001 denotes the character flag. The black pixels in the figure are pixels having the character attribute, where "1" is generated as the character flag and "0" is generated for the other area (white area in the figure). Reference numeral 12002 denotes the graphic flag. The graphic area corresponds to "1" and the other area corresponds to "0". Reference numeral 12003 denotes the dot flag. The dot area corresponds to "1" and the other area corresponds to "0". Reference numeral 12004 denotes photography area. The photography area is not applicable to any of the above-described 12001, 12002, and 12003.

In short, the photography area is an area other than characters, graphics, and dots, and all flags are set as 0. In the example shown in FIG. 12, the photography area is all white. In the configuration of 4-bit signal, these flags are arranged as shown in Table 1.

TABLE 1

| | bit 3 | bit 2 | bit 1 | bit 0 |
|---|---|---|---|---|
| 1 | RSV | character | graphic | dot |
| 0 | RSV | other than character | other than graphic | other than dot |

In this table, the most significant bit (MSB) of the four bits is a free bit (reserved bit). For example, attribute data having bit 2 of 1, bit 1 of 0, and bit 0 of 0 is generated for pixels with the character attribute. When the image attribute is detected for each pixel through the above-described image-area separation processing, image processing according to the image attribute can be carried out by the relevant image processing section.

Figure 13:
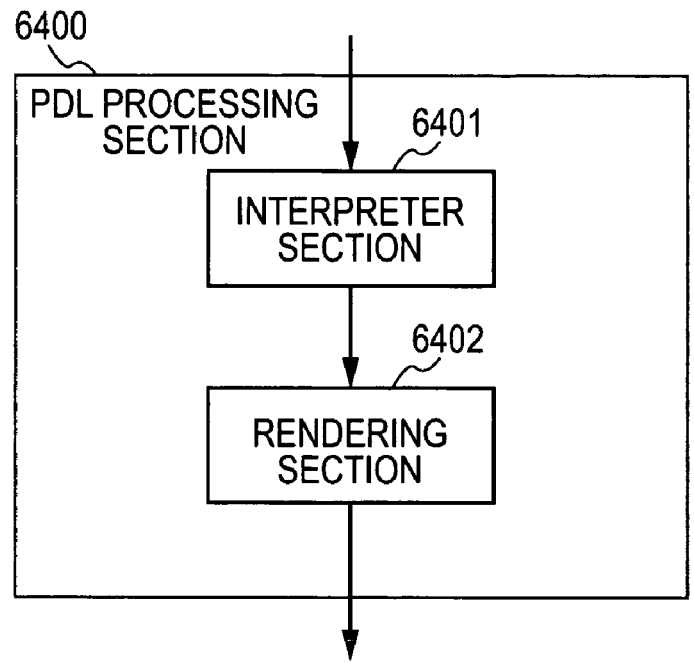
FIG. 13 is a block diagram illustrating an exemplary architecture of the PDL processing section shown in FIG. 5 according to the present invention.

FIG. 13 is a diagram illustrating one example of the PDL processing section 6400 shown in FIG. 5. The PDL processing section 6400 may be realized by hardware or software. The PDL processing section 6400 receives PDL data from the image-processing apparatus as print data and interprets the PDL data in an interpreter section 6401. In this case, the character attribute, graphic attribute, and bitmapped image attribute are determined in the interpreter section 6401 to generate PDL attribute data. The generated PDL attribute data is passed to a rendering section 6402 together with the image intermediate data. The rendering section 6402 receives the image intermediate data and the PDL attribute data from the interpreter section to generate image data in the bitmap format. Table 2 shows the generated PDL attribute data arranged in the configuration of a 4-bit signal. In this table, the most significant bit (MSB) of the four bits is a free bit (reserved bit).

TABLE 2

| | bit 3 | bit 2 | bit 1 | bit 0 |
|---|---|---|---|---|
| 1 | RSV | character | graphic | bitmapped image |
| 0 | RSV | other than character | other than graphic | other than bitmapped image |

The above-described output-image processing section 6600 is constructed to select image processing appropriate for each pixel of the image data based on the attribute data. The image data input to the output-image processing section 6600 is a bitmapped image regardless of from which source the image data has been generated (i.e., job type). However, the attribute data input to the output-image processing section 6600 depends on the source from which the image data has been generated. As described above, if the input source is the scanner (i.e., the job type is a scan job), scan attribute data is generated based on the definition specified in Table 1. On the other hand, if the input source is a computer (PDL) (i.e., the job type is a PDL job), PDL attribute data is generated based on the definition specified in Table 2.

Furthermore, combined attribute data, which is generated for a job resulting from scan image data being transmitted to the image-editing apparatus and then being returned from the image-editing apparatus to the image-forming apparatus as PDL, has a different attribute data format from those of the above-described attributes data. In other words, the output-image processing section 6600 is constructed to determine the definition of the attribute data accompanying the image data according to the job type (i.e., scan job, PDL job, or scan job that has passed through the image-editing apparatus) of the input image data. Output image processing is adaptively carried out based on the definition of the determined attribute data. The job types are not limited to the above described three types.

Furthermore, it is assumed that PDL attribute data in the embodiments according to the present invention is generated for each pixel of the image data, as with the scan attribute data. However, some types of PDL attribute data are generated on an object-by-object basis in the image data, rather than on a pixel-by-pixel basis in the image data. In this case, the attribute data can be referred to as area-based rather than pixel-based. Regardless of the attribute data format, the present invention requires attribute information corresponding to a pixel to which editing is applied through attribute data editing (to be described later). In other words, if the PDL attribute data to be acquired is pixel-based, then the relevant attribute data can be used as-is. On the other hand, if the PDL attribute data to be acquired is area-based, attribute information for the area including the pixel to be edited can be used.

Figure 14:
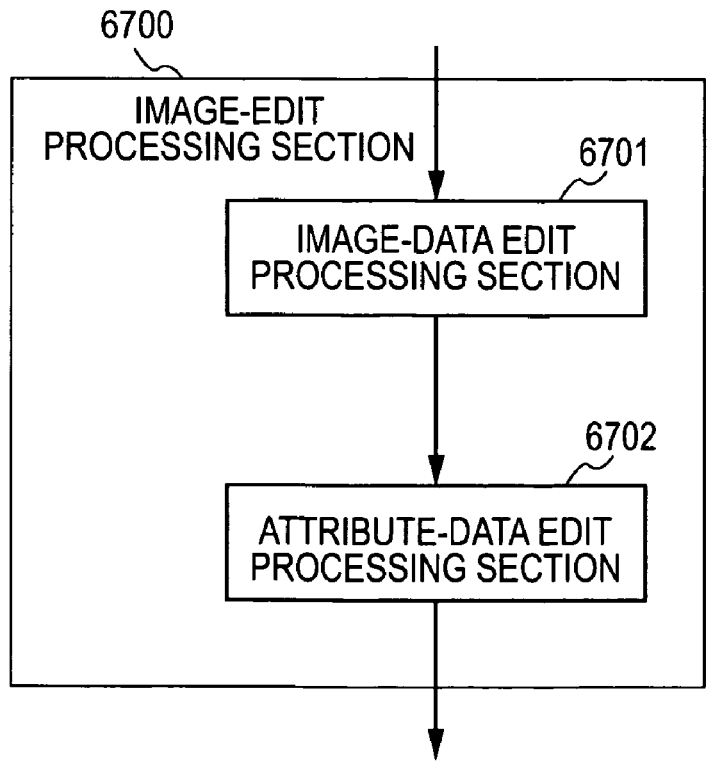
FIG. 14 is a block diagram illustrating an exemplary architecture of the image-edit processing section shown in FIG. 5 according to the present invention.

One example of processing by the image-edit processing section 6700 shown in FIG. 5 will now be described with reference to FIG. 14. First, an image-data edit processing section 6701 applies image editing to the image data based on a desired image-editing instruction issued by the operator. This processing includes any type of editing, such as trimming editing of the image data, image combine processing, color processing, and enlargement/reduction processing. In addition, the image-data edit processing section 6701 determines whether the operator's image-editing instruction is an editing instruction involving editing of the attribute data, such as enlargement/reduction or movement of the image data.

If it is determined that the operator's image-editing instruction is an editing instruction involving editing of the attribute data, then in an attribute-data edit processing section 6702, editing similar to that applied to the image data is applied to the attribute data read-out from the hard disk. By doing this, the uniqueness of the image data and the attribute data is maintained. For example, if the processing of enlarging the image data is carried out, similar enlargement processing is also applied to the attribute data. The structure of the image-edit processing section 6700 is not limited to that shown in FIG. 15. The image-edit processing section 6700 can be realized by hardware or by a software program that is executed by the CPU.

Figure 15:
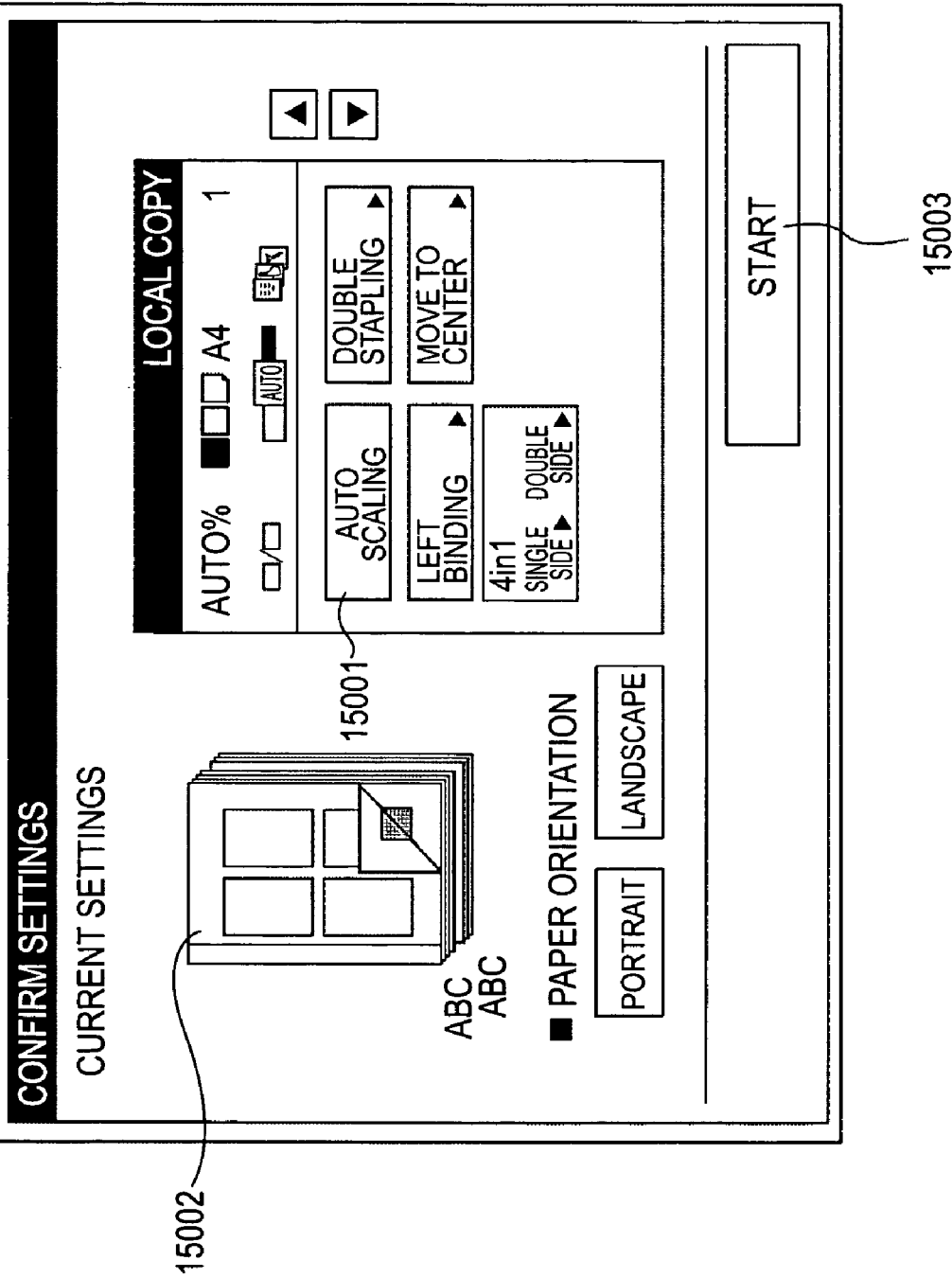
FIG. 15 is a schematic view of an exemplary operating section of the image-forming apparatus according to the present invention.

FIG. 15 is a diagram illustrating an exemplary display screen of the operating section provided in the image-forming apparatus according to the present invention. Reference numeral 15000 denotes the operating section. Reference numeral 15001 denotes an image-processing instruction button for specifying image processing applied to images read-out on the scanner unit 3200. Reference numeral 15002 denotes a preview-image display section for allowing the operator to confirm the content of the image processing specified with the image-processing instruction button 15001.

Reference numeral 15003 denotes a start button for starting processing according to the image processing instruction specified with the image-processing instruction button 15001. When processing is started as a result of the start button 15003 being operated, an image is read by the scanner unit 3200, the read-out image data is stored in the hard disk 4011 of the image-forming apparatus, and the image data is transmitted to the image-processing apparatus.

Figure 16:
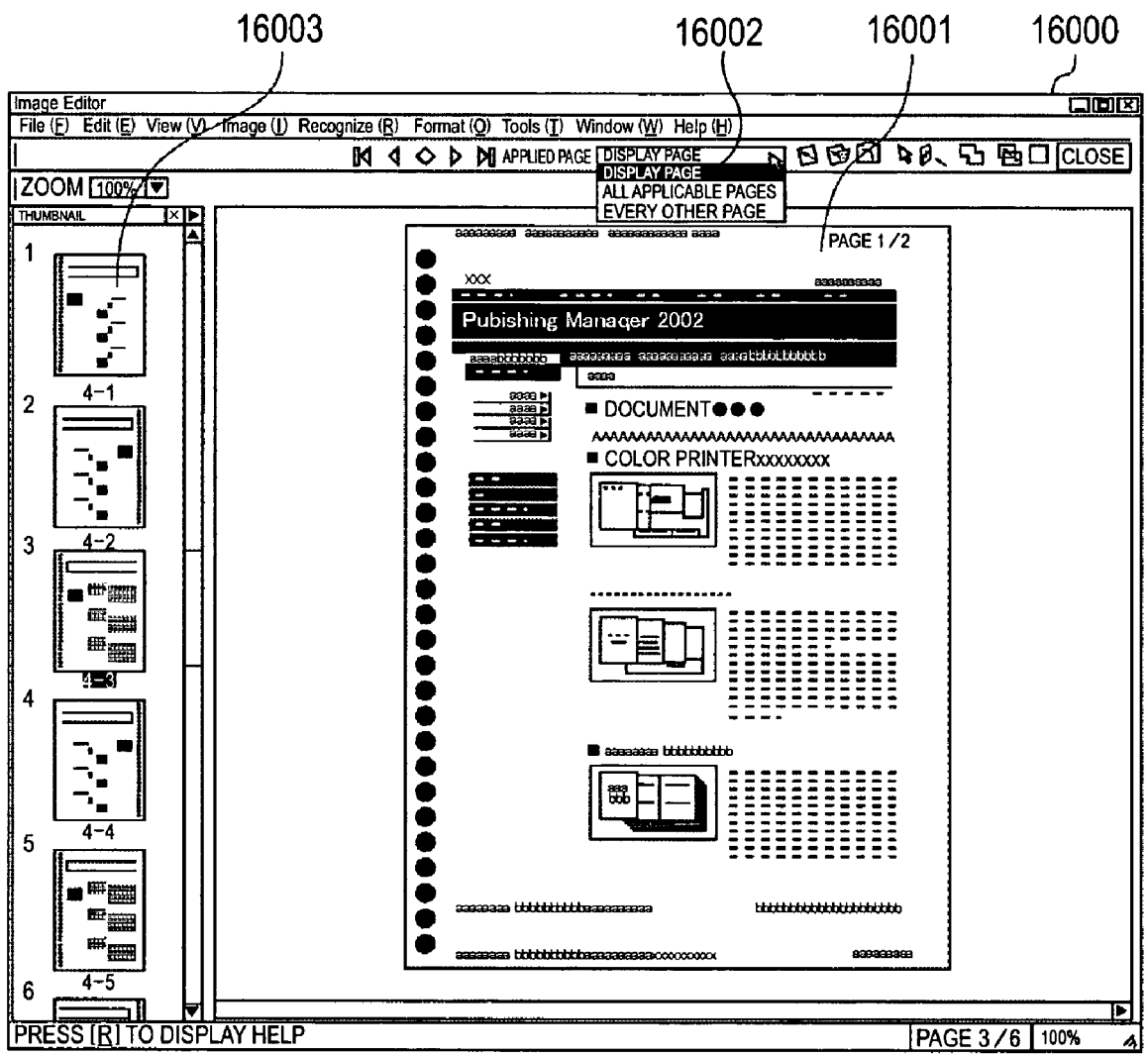
FIG. 16 is a schematic view of an exemplary operating section of the image-editing apparatus according to the present invention.

One example of an operating screen 16000, provided in the image-editing apparatus, displayed on the display section by application software for image editing according to the present invention will now be described with reference to FIG. 16. Reference numeral 16001 denotes a preview image display area in which bitmapped image data received from the network communication I/F 2006 is displayed for the operator.

Reference numeral 16002 denotes a menu display section for selecting and performing a type of image processing to be applied to the image data displayed on the preview image display area 16001. The menu display section 16002 includes an image processing menu for the entire image or a particular area of the image displayed in the preview image display area 16001, a menu for image processing involving a plurality of page data items, a menu related to print performance, and other menus.

Reference numeral 16003 denotes a thumbnail image display area for displaying thumbnails of all bitmapped image data included in a job received from the network communication I/F 2006. When a thumbnail image displayed in the thumbnail image display area 16003 is selected using the pointing device 2014, the thumbnail image can be displayed in the preview image display area 16001. The operator performs image editing on an image editing screen as shown in FIG. 16.

Figure 17A:
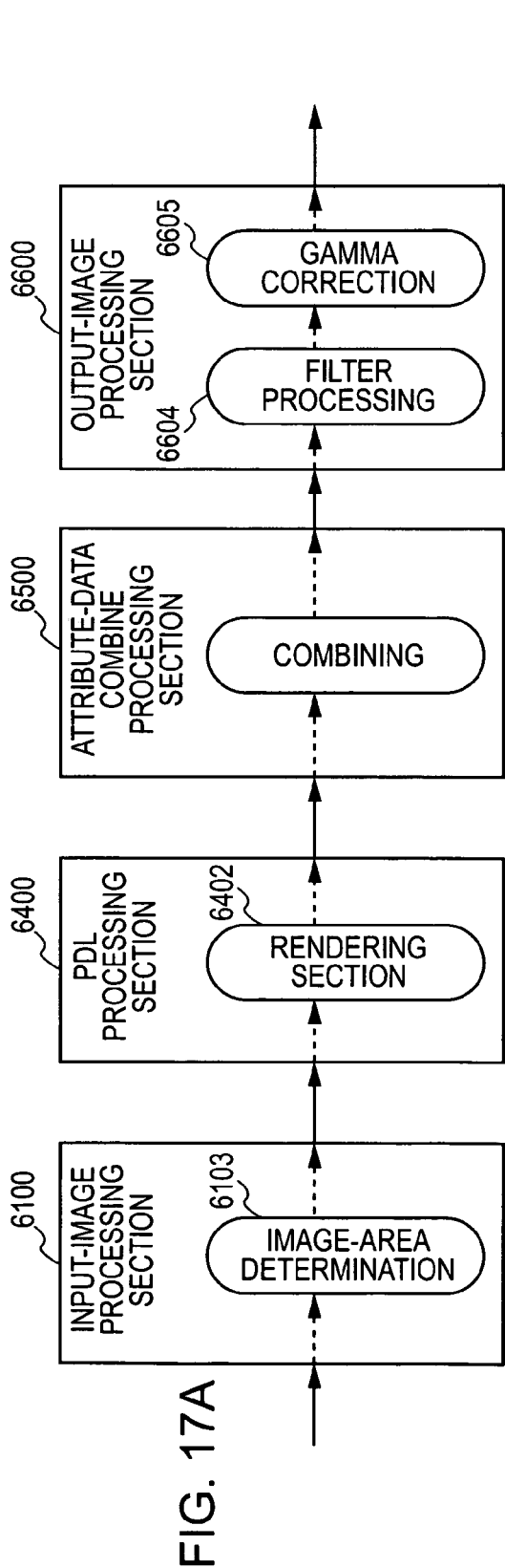
FIGS. 17A and 17B are diagrams illustrating exemplary processing flow and data flow according to the present invention.
Figure 17B:
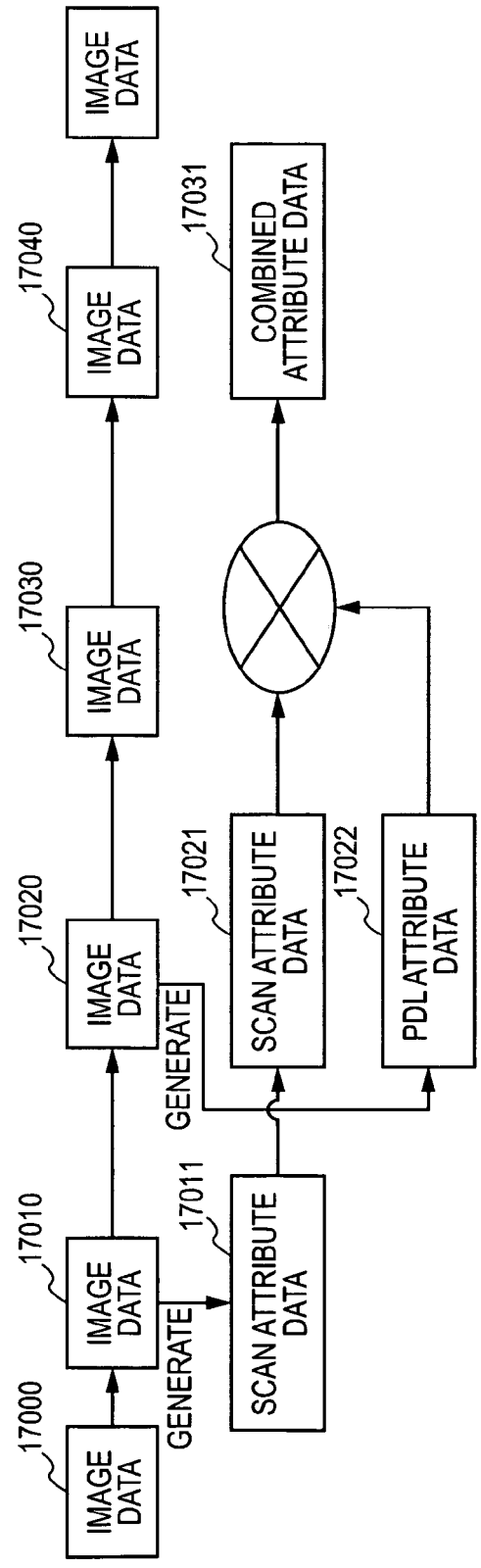

FIGS. 17A and 17B are diagrams illustrating an image data processing flow and an attribute data processing flow carried out by the image processing system according to the present invention. The exemplary processing flows shown in FIGS. 17A and 17B are related to data exchange between the image-forming apparatus and the image-editing apparatus as with the processing flow described with reference to FIG. 5.

As shown in FIG. 17B, input image data 17000 input by the scanner section 3200 is input to the input-image processing section 6100 (see FIG. 17A) of the image-forming apparatus 5100 and is then subjected to each type of image processing described with reference to FIG. 6. As shown in FIG. 17A, only the image-area determining section 6103 provided in the input-image processing section 6100 is described for the sake of simplicity. The image data 17000 is input to the image-area determining section 6103 and is then subjected to image-area determination processing. As a result, scan attribute data 17011, as described above, is generated. In this example, 4-bit attribute data described with reference to FIG. 12 is assumed.

In order to decipher the image data subjected to the above-described image processing in the input-image processing section 6100 (see FIG. 6) from the input image data, the image data subjected to image processing in the input-image processing section 6100 is assigned a code 17010. Next, the image data 17010 output from the input-image processing section 6100 and the scan attribute data 17011 are compressed in the compression-image processing section 6200 (see FIG. 7) and stored in the hard disk 4011.

Furthermore, the compressed image data 17010 and scan attribute data 17011 are transferred to the image-editing apparatus 5200 (see FIG. 5) via the network. The transferred image data 17010 and scan attribute data 17011 are decompressed in the decompression-image processing section 6300 (not shown in FIG. 17A). The decompressed image data is subjected to image editing in the image-edit processing section 6700. The image data subjected to image editing is assigned a code 17020 to discriminate from other image data for description. In addition, the scan attribute data is edited according to image editing. Here, in order to discriminate the scan attribute data edited according to image editing from the scan attribute data generated in the input-image processing section 6100, the edited scan attribute data is assigned a code 17021 for description.

After the above-described processing in the image-editing apparatus 5200, the edited image data 17020 and the edited scan attribute data 17021 are transmitted to the PDL processing section 6400 (see FIG. 17A) of the image-forming apparatus 5100 as a print job. In the PDL processing section 6400, the above-described interpreter section 6401 interprets the PDL data transmitted as a print job to generate PDL attribute data 17022. In addition, the rendering section 6402 produces image data 17030 in the bitmap format based on the PDL data.

Next, in the attribute-data combine processing section 6500, the scan attribute data generated in the image-area determining section 6103 (see FIG. 6) is combined with the PDL attribute data 17022 acquired by interpreting the PDL data in the PDL processing section 6400. Through this combine processing, combined attribute data 17031 is generated. In this case, the scan attribute data combined in the attribute-data combine processing section 6500 is equivalent to the attribute data 17011 if there is no scan attribute data edited together with image data in the image-editing apparatus 5200. If there is scan attribute data edited together with image data in the image-editing apparatus 5200 (see FIG. 5), the edited scan attribute data 17021 is combined with the PDL attribute data 17022. Further details of the attribute-data combine processing section 6500 will be described later.

Next, the image data 17030 generated in the PDL processing section 6400 and the combined attribute data 17031 are input to the output-image processing section 6600. In the output-image processing section 6600, the above-described image processing is applied to the input image data. FIG. 17A illustrates filter processing 6604 and gamma correction processing 6605. In these processing operations, optimal processing for image areas, such as a bitmapped image area and a character area, in the image data 17030 is carried out according to the combined attribute data 17031 to generate image data 17040 which is a final output. The generated image data 17040 is output from the printing section.

Next, the reason why attribute data is combined is described, followed by an exemplary detailed combining method by the attribute-data combine processing section 6500. The fact that scan attribute data generated by image reading at a certain pixel position may have different attribute information from that of scan data, at the same pixel position, that has been-transmitted via the image-editing apparatus has already been described. For example, even a pixel determined as a "character" in the scan attribute data will have the attribute "bitmapped image" in the PDL attribute data if the pixel has gone through the image-editing apparatus. In this case, if the "bitmapped image" attribute generated based on the image data transmitted from the image-editing apparatus is applied to a pixel whose attribute is originally a "character", the image quality is degraded. Therefore, the "character" attribute should be applied in the combined attribute data by giving priority to the scan attribute data.

However, the "graphic" or "character" attribute may be assigned depending on the editing in the image-editing apparatus. For example, if a character or graphic is drawn by the image-editing apparatus at a pixel position determined as a "character" in the scan attribute data, the pixel position in question will have the attribute corresponding to the drawn character or graphic in the PDL attribute data. In this case, the attribute information of the PDL attribute data should be applied to the combined attribute data by giving priority to editing of the PDL attribute data.

As described above, it is desirable that combined attribute data be adaptively generated according to the relationship of attribute information between the scan attribute data and the PDL attribute data. Furthermore, as shown in Tables 1 and 2, the definition of each attribute flag bit differs between the scan attribute and the PDL attribute. In the combined attribute data, it is also necessary to eliminate such differences in the definition.

In light of the aforementioned discussion, the exemplary embodiment of the present invention proposes that attribute information be determined adaptively for each pixel of the image data generated from PDL data according to the type of the scan attribute data and the type of the PDL attribute data generated from the PDL data.

Since scan image data is bitmapped image data, image data generated from PDL data has the attribute "bitmapped image" if that image data is received via the image-editing apparatus. For this reason, it is determined whether the scan attribute data corresponding to each pixel in the image data generated from PDL data is a dot or not. If the determination result indicates a dot attribute, it is determined whether the PDL attribute data corresponding to the position of that pixel is a bitmapped image. If the determination result indicates that the PDL attribute data corresponding to the pixel position is a bitmapped image, it is known that the pixel is assigned a dot in the scan attribute and is assigned a bitmapped image in the PDL attribute. In this case, the pixel in question is set to have an attribute value of dot and bitmapped image in the combined attribute data. Since this setting depends on the definition of the combined attribute data, it is not always necessary to set an attribute value as described above. For example, simply setting the attribute "dot" for such a pixel does not degrade the original image quality. In other words, the image quality similar to that of an image acquired through image forming of normal scan image data, namely, a copy image can be achieved. However, normal scan image data may result in a bitmapped image different from that resulting from image data generated from PDL data, due to differences in resolution, rendering processing, and so on. For this reason, an image with higher image quality may be obtained by setting an attribute value indicating "dot" and "bitmapped image" in the combined attribute data and by tuning each function of the output-image processing section to achieve output image processing optimal for the attribute.

Figure 18:
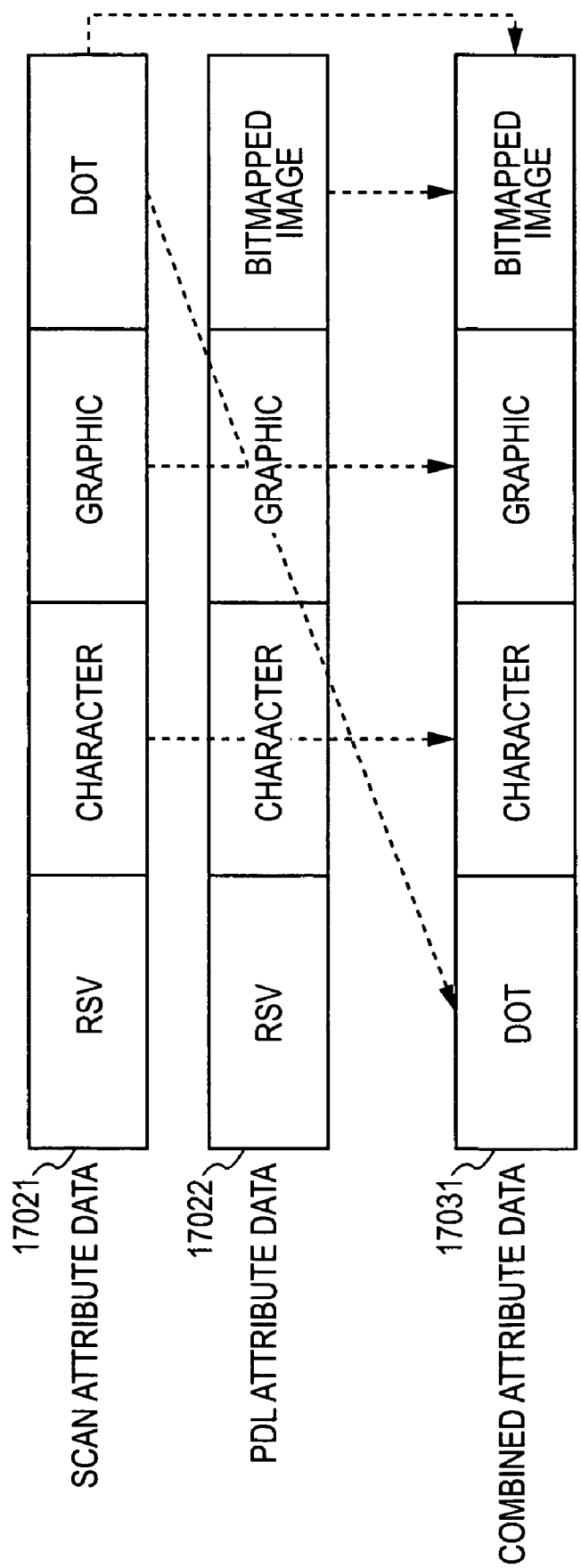
FIG. 18 is a diagram illustrating a concept related to a first embodiment of the attribute-data combine processing in FIG. 5 according to the present invention.

An exemplary control flow based on the above-described processing will now be described with reference to FIGS. 18, 19, and 20. FIG. 18 depicts the outline of combining the scan attribute data 17021 and the PDL attribute data 17022 shown in FIG. 17B to generate the combined attribute data 17031. This processing is carried out by the attribute-data combine processing section 6500.

Further exemplary details of the processing will be described with reference to FIGS. 19 and 20. In the combining procedure, the information of the scan attribute data 17021 is given priority and information of the PDL attribute data 17022 is used as supplemental information to produce the combined attribute data 17031. The definition of the scan attribute data 17021 and the definition of the PDL attribute data 17022 have been described with reference to Tables 1 and 2, and thus will not be described again here. It should be noted, however, that exemplary combined attribute data 17031 may be defined such that the most significant bit (bit 4) corresponds to a dot, bit 3 to a character, bit 2 to a graphic, and bit 1 to a bitmapped image in the 4-bit string.

Furthermore, it should be appreciated that the attribute "bitmapped image" does not exist in scan image data for this processing because all scan image data are bitmapped image data. For this reason, the scan attribute data generated from scan image data is subjected to the processing of differentiating among a character region, a graphic region, and a dot region in the bitmapped image data. Additionally, the processing of changing the definition of attribute data according to the job type is also provided. For this processing, since the job type indicates a scan job that has gone through the image-editing apparatus, the attribute data is processed according to the definition of combined attribute data.

Figure 19:
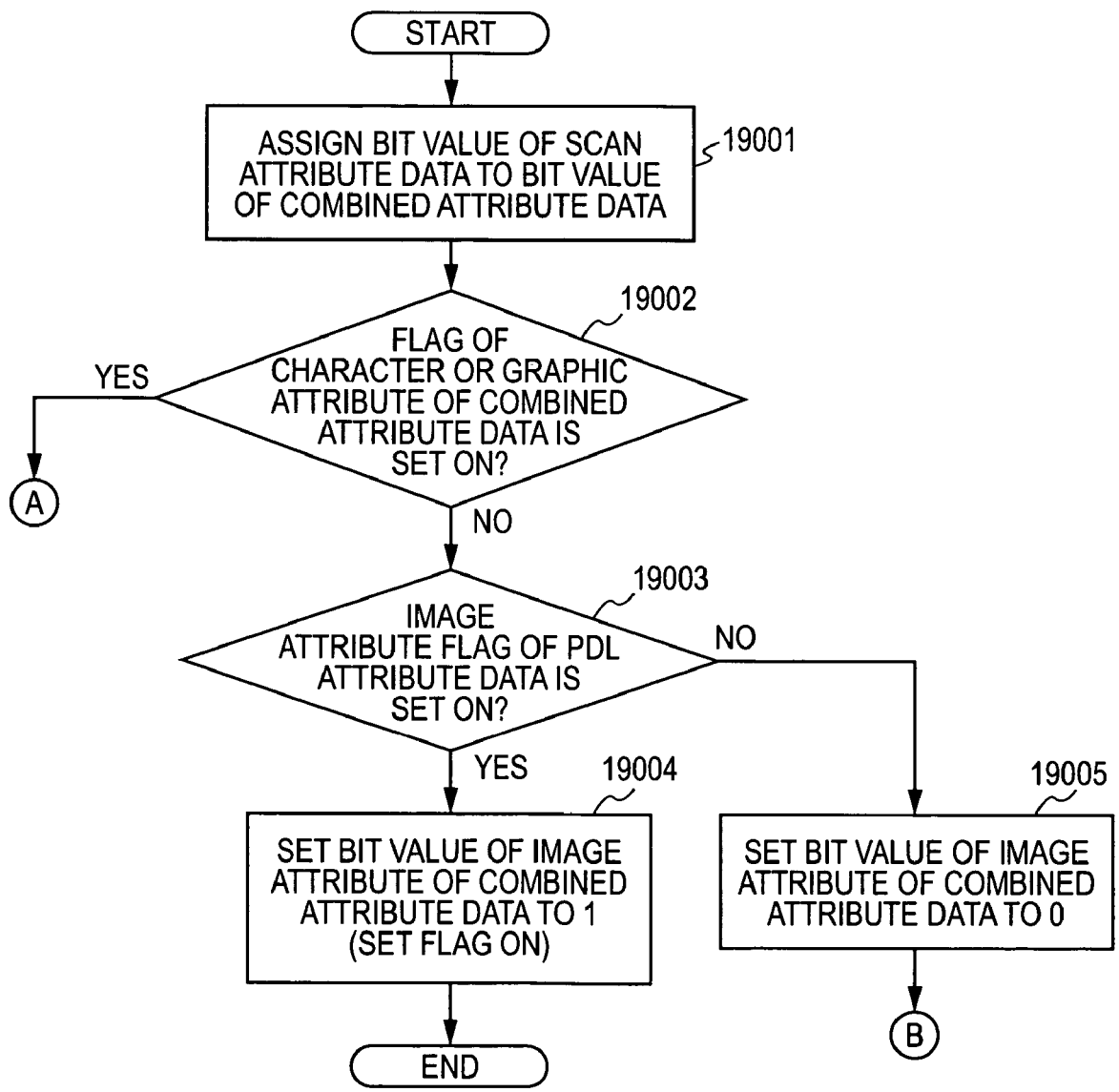
FIG. 19 is a flowchart illustrating the first embodiment of the attribute-data combine processing in FIG. 5 according to the present invention.
Figure 20:
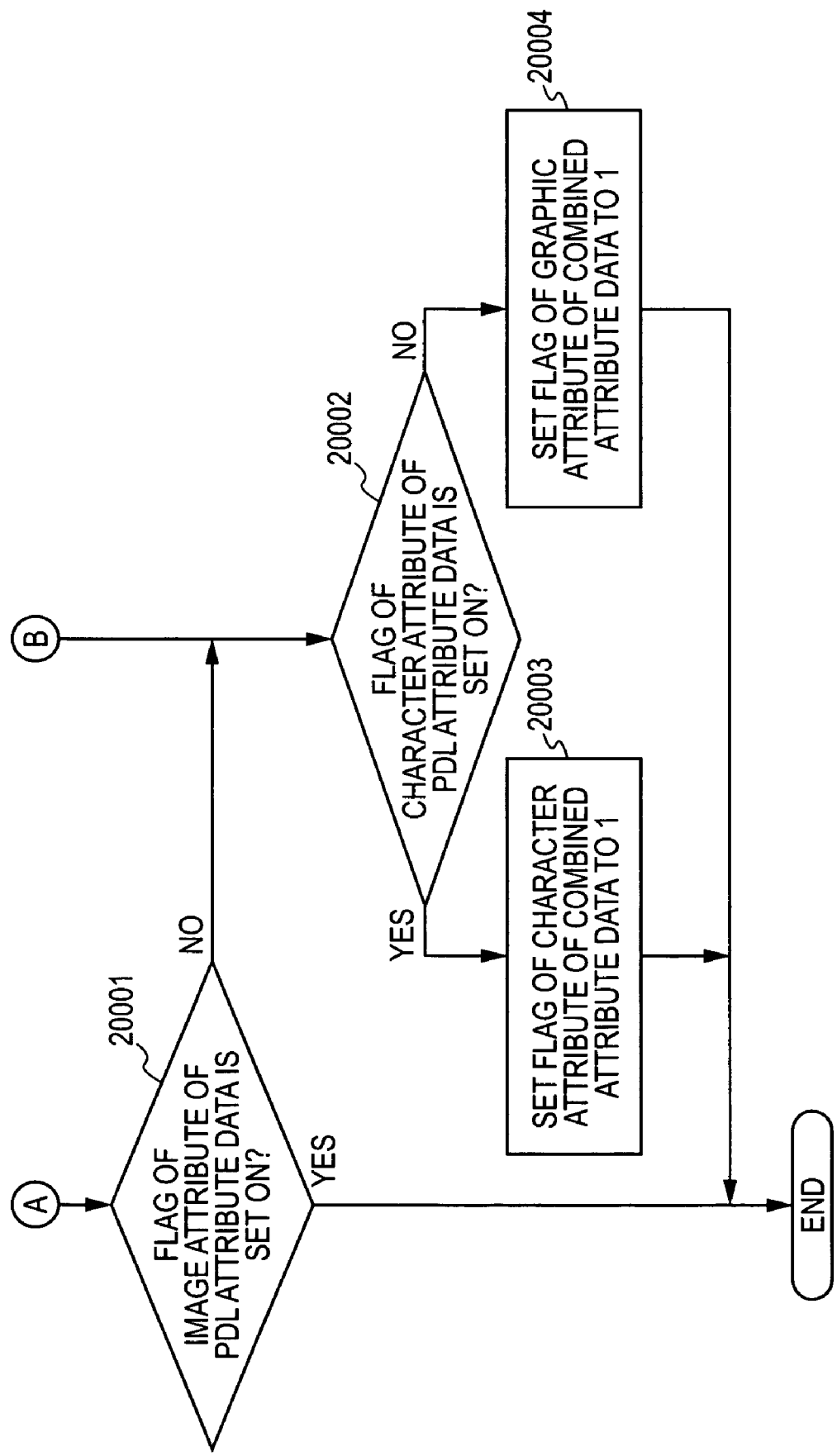
FIG. 20 is a flowchart illustrating a second embodiment of the attribute-data combine processing in FIG. 5 according to the present invention.

Now referring to FIG. 19, in step 19001, information of each bit of the scan attribute data 17021 is assigned as-is to the corresponding bit of the combined attribute data 17031. At this time, information of bit 1 (dot flag) of the scan attribute data 17021 is assigned to both the most significant bit (bit 4) and the least significant bit (bit 1) of the combined attribute data 17031.

Next, in step 19002, it is determined whether the flag of either the character attribute or graphic attribute of the combined attribute data 17031 is set ON. In other words, it is determined whether the flag of either the character attribute or graphic attribute of the scan attribute data 17021 is set ON. The phrase "a flag is set ON" means that the bit corresponding to the flag is set to 1 as described with reference to Tables 1 and 2. In short, this determination corresponds to the processing of determining whether the attribute data of the pixel of interest is a dot or not. For example, if the low-order three bits in the attribute data (4 bits) of the pixel of interest are "001", this means that the pixel is included in a dot image area.

If the flag of either the character attribute or graphic attribute assigned to the combined attribute data 17031 is set ON (Yes) in step 19002, the flow is continued to A of FIG. 20 to be described below.

If the flag of neither the character attribute nor the graphic attribute is set ON (No), the bits corresponding to the character and graphic attributes are 0 and the bits corresponding to the dot and bitmapped image are 1 in the combined attribute data 17031. In other words, since the bit corresponding to dot in the scan attribute data 17021 is 1, that bit is assigned to the bit corresponding to dot and the bit corresponding to bitmapped image in the combined attribute data 17031.

Next, in step 19003, the state of the attribute "bitmapped image" in the PDL attribute data 17022 at the pixel of interest is checked. More specifically, it is determined whether a pixel determined as a dot in the scan attribute data 17021 is a bitmapped image in the PDL attribute data 17022. Here, if the PDL attribute data 17022 has the attribute "bitmapped image" (i.e., if the bit corresponding to the attribute "bitmapped image" is 1), the flow proceeds to step 19004.

In step 19004, the bit value of the attribute "bitmapped image" is written over the bit corresponding to the attribute "bitmapped image" in the combined attribute data 17031. More specifically, the bit corresponding to the attribute "bitmapped image" in the combined attribute data 17031 is set as 1 for pixels determined as dots in the scan attribute data 17021 and determined as bitmapped images in the PDL attribute data 17022. With the processing in step 19001, a bit value of 1 is already assigned to the bit corresponding to the attribute "bitmapped image" in the combined attribute data 17031. Therefore, it is not always necessary to write a value of 1 of the bit corresponding to the attribute "bitmapped image" in the PDL attribute data 17022 over the bit corresponding to the attribute "bitmapped image" in the combined attribute data 17031, to which a bit value of 1 has already been assigned.

If, in step 19003, the PDL attribute data 17022 does not have the attribute "bitmapped image" (i.e., if the bit corresponding to the attribute "bitmapped image" is 0), the flow proceeds to step 19005. In step 19005, 0 is written over the bit corresponding to the attribute "bitmapped image" in the combined attribute data 17031. Thereafter, the flow proceeds to B in FIG. 20 to be described later.

Now referring to FIG. 20 further exemplary processing details will be described. First, if the flag of either the character attribute or graphic attribute in the combined attribute data 17031 is set ON in step 19002 of FIG. 19, the flow proceeds to step 20001. In step 20001, it is determined whether the PDL attribute data corresponding to the pixel in question is the attribute "bitmapped image" (i.e., whether the bit corresponding to the attribute "bitmapped image" is 1). If it is determined that the PDL attribute data is the attribute "bitmapped image", it means that no editing that causes a character or graphic has been applied at that pixel position by the image-editing apparatus. In short, the attribute of that pixel is a "character (or graphic)" in the scan attribute data and "bitmapped image" in the PDL attribute data. Thus, it is sufficient to set the character attribute or graphic attribute of the scan attribute data to the corresponding attribute value in the combined attribute data. Although, in this embodiment, 0 is set to the flag representing the attribute "bitmapped image" in the combined attribute data, attribute values representing both "character (or graphic)" and "bitmapped image" may be set as described above.

If it is determined that the PDL attribute data corresponding to the pixel in question is not the attribute "bitmapped image" in step 20001, the flow proceeds to step 20002. The flow also proceeds from step 19005 in FIG. 19 to step 20002. In step 20002, it is determined whether the PDL attribute data is the character attribute. If it is determined that the PDL attribute data is the character attribute, the flow proceeds to step 20003. A determination in step 20002 that the PDL attribute data is the character attribute means that editing that cause a character has been applied at that pixel position by the image-editing apparatus. Therefore, in step 20003, 1 is set to the character attribute flag in the combined attribute data by giving priority to editing by the image-editing apparatus. In this case, the graphic attribute flag is set as 0.

On the other hand, if it is determined in step 20002 that the PDL attribute data is not the character attribute, the flow proceeds to step 20004. A determination in step 20002 that the PDL attribute data is not the character attribute means that editing that cause a graphic has been applied at that pixel position by the image-editing apparatus. Therefore, in step 20004, 1 is set to the graphic attribute flag in the combined attribute data by giving priority to editing by the image-editing apparatus. In this case, the character attribute flag is set as 0.

As a result of the above-described processing, the combined attribute data 17031 is generated. The output-image processing section 6600 recognizes that the job type is a scan job that has gone through the image-editing apparatus, and applies image processing to the image data as defined by the combined attribute data in FIG. 18. With the above-described structure, attribute data for applying optimal image processing to image data can be generated without losing information of the scan attribute data.

Second Exemplary Embodiment

Figure 21:
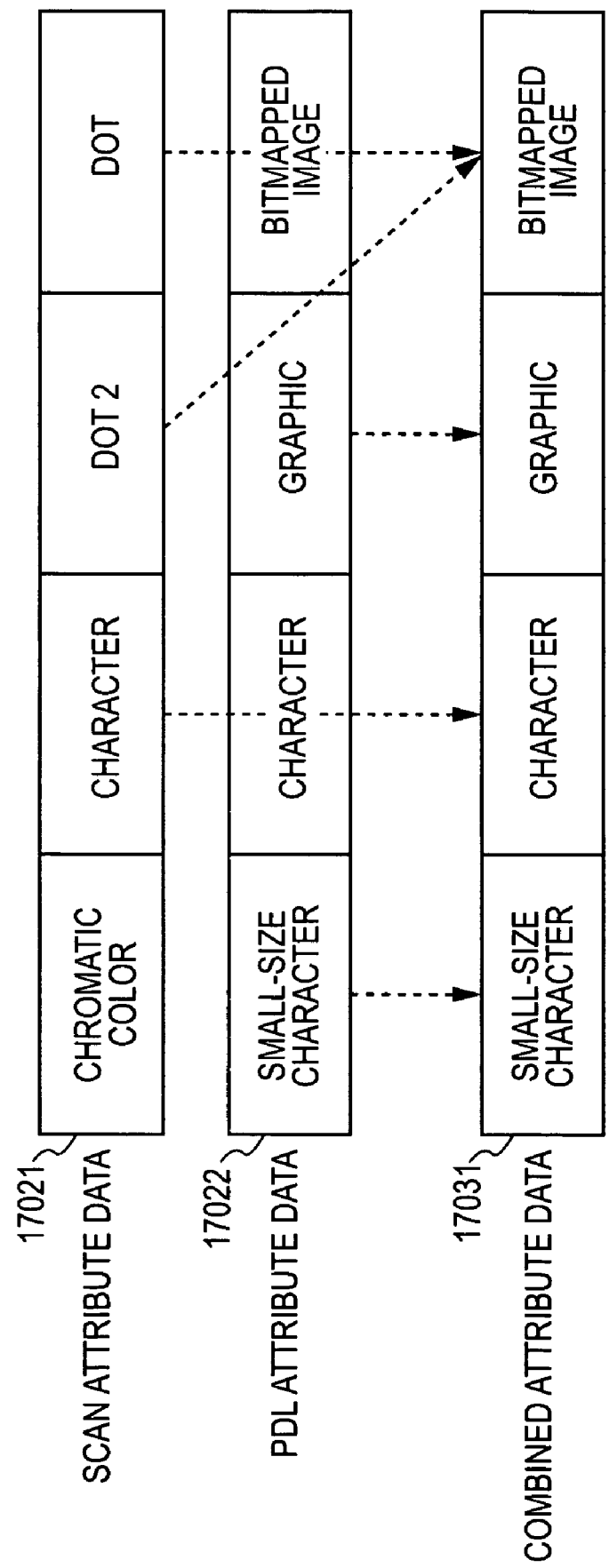
FIG. 21 is a diagram illustrating a concept related to a third embodiment of the attribute-data combine processing in FIG. 5 according to the present invention.
Figure 22:
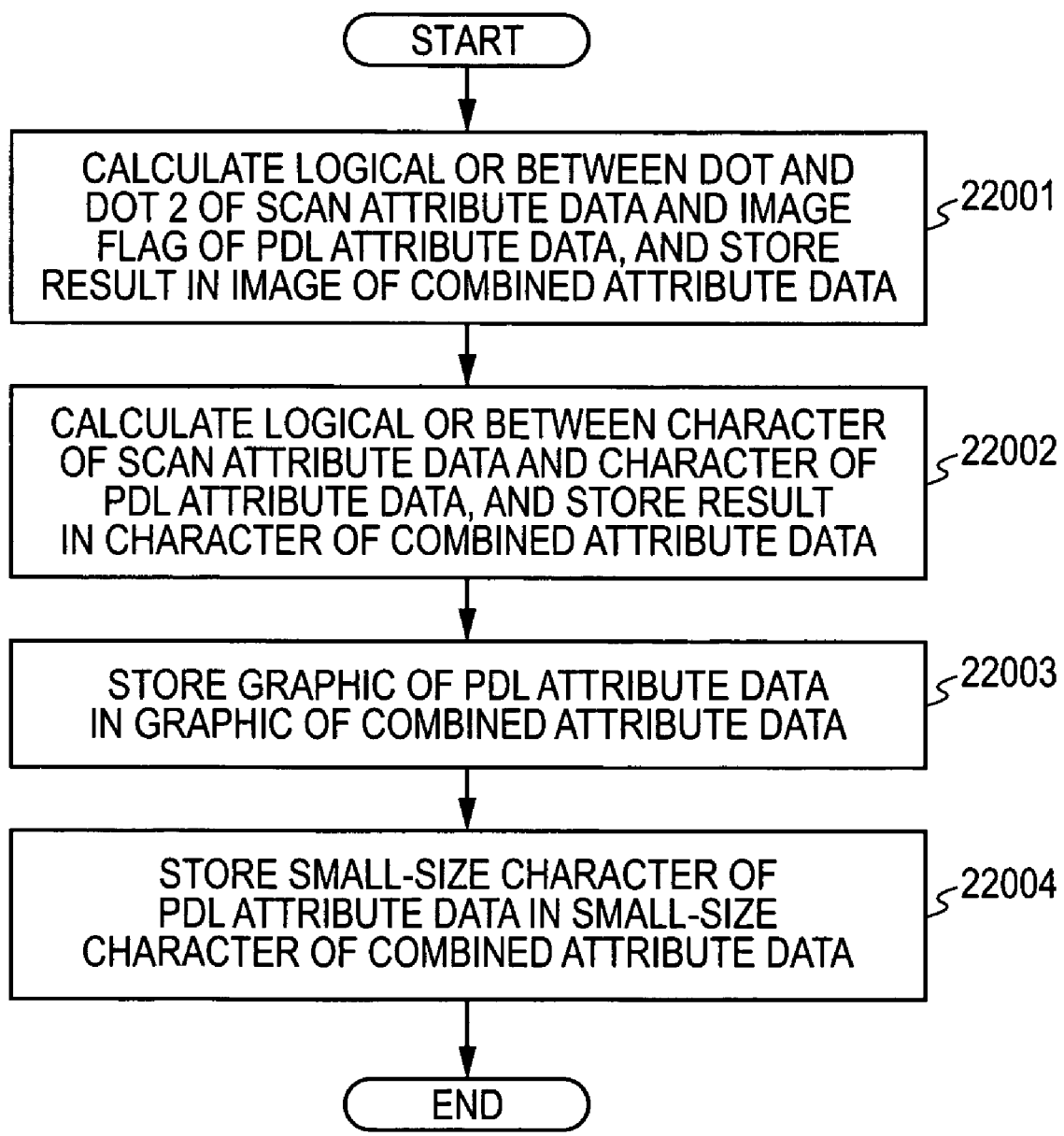
FIG. 22 is a flowchart illustrating the third embodiment of the attribute-data combine processing in FIG. 5 according to the present invention.

A combining method different from that according to the first embodiment will be described in a second embodiment with reference to FIGS. 21 and 22. In the above-described first embodiment, combined attribute data is configured of four bits. Furthermore, scan attribute data and PDL attribute data to be combined with each other are each configured of four bits.

For example, the scan attribute data and the PDL attribute data are configured such that three bits are enough to define all attribute types. In addition, the scan attribute data and the PDL attribute data have the attribute flags "character" and "graphic" in common, and differ from each other in attribute flags "dot" and "bitmapped image". In short, there are a total of four different attribute types possible in the scan attribute data and the PDL attribute data. This means that discrimination among those four attribute types is sufficient in the combined attribute data. Thus, the combined attribute data is configured of four bits. However, the number of attribute types in at least one of the scan attribute data and the PDL attribute data increases, combined attribute data may not be defined as in the first embodiment. More specifically, if the number of attribute types available in the scan attribute data and the PDL attribute data is larger than the number of bits in combined attribute data, not all attribute types can be assigned to the bits in the combined attribute data.

The second embodiment proposes a combining method that can appropriately function even in such a case. FIG. 21 illustrates the concept of the second embodiment. The scan attribute data 17021 shown in FIG. 21 is configured of four bits, where the bits are defined as chromatic color, character, dot 2, and dot, respectively, starting from the high-order bit. The chromatic color represents an attribute indicating whether the pixel is a color (other than monochrome). The difference between dot 2 and dot lies in, for example, the frequency of the dot.

On the other hand, the PDL attribute data 17022 is configured of four bits, where the bits are defined as small-size character, character, graphic, and bitmapped image, respectively, starting from the high-order bit. The difference between small-size character and character lies in the character size. In this case, there a total of seven attribute types available in the scan attribute data 17021 and the PDL attribute data 17022, and therefore not all attribute types can be defined in the combined attribute data since the combined attribute data is configured of four bits.

To overcome this problem, in this second embodiment the processing of combining the attributes in the scan attribute data and the PDL attribute data is carried out to allow all attribute types to be defined using the amount of data (four bits) of the combined attribute data. It goes without saying that the attribute data to be subjected to merge processing needs to be appropriately determined to prevent this merge processing from degrading the image quality of image data that has gone through the image-editing apparatus.

First, the definition of each bit in the combined attribute data will be described. In this embodiment, the attribute types of the bits are defined as small-size character, character, graphic, and bitmapped image, respectively, starting from the high-order bit. This definition is shown in FIG. 21 as the combined attribute data 17031. In this mechanism, the scan attribute data 17021 and the PDL attribute data 17022 are combined as required so as to satisfy the definition of attribute types in the combined attribute data 17031.

Exemplary combined attribute data generation processing according to this embodiment will now be described with reference to the flowchart shown in FIG. 22. First, in step 22001, a logical OR among the bit values of the dot flag and the dot 2 flag in the scan attribute data 17021 and the bitmapped image flag in the PDL attribute data 17022 is calculated. In short, a logical OR operation between the bit value of the dot flag, the bit value of the dot 2 flag, and the bit value of the bitmapped image flag is carried out. Then, this calculation result is stored in the bitmapped image attribute bit of the combined attribute data 17031.

Next, in step 22002, a logical OR between the bit values of the character flag in the scan attribute data 17021 and the character flag in the PDL attribute data 17022 is calculated. In short, a logical OR operation between the bit value of the character flag in the scan attribute data 17021 and the bit value of the character flag in the PDL attribute data 17022 is carried out. Then, this calculation result is stored in the character attribute bit of the combined attribute data 17031.

Next, in step 22003, the bit value of the graphic flag in the PDL attribute data is stored as-is in the graphic attribute bit of the combined attribute data. Furthermore, in step 22004, the bit value of the small character flag in the PDL attribute data is stored in the small-size character attribute bit of the combined attribute data.

With the above-described processing, the combined attribute data 17031 is generated for each pixel. As described above, the scan attribute data, the PDL attribute data, and the combined attribute data are all generated for each pixel of the image data. In addition, the character flag, the dot 2 flag, and the dot flag in the scan attribute data 17021 are exclusive to one another. Furthermore, the small-size character flag, the character flag, the graphic flag, and the bitmapped image flag in the PDL attribute data 17022 are also exclusive to one another. For example, both the character and the bitmapped image cannot be set as 1 in the scan attribute data 17021. This rule also applies to the PDL attribute data 17022.

In this embodiment, however, the small-size character flag, the character flag, the graphic flag, and the bitmapped image flag may not have exclusive relationships with one another in the combined attribute data 17031. For example, if the bit string in the scan attribute data 17021 is "1001" and the bit string in the PDL attribute data 17022 is "0001", then the bit string in the combined attribute data 17031 is "0001". However, if the bit string in the scan attribute data 17021 is "0001" and the bit string in the PDL attribute data 17022 is "0100", then the bit string in the combined attribute data 17031 is "0101".

Cases where two or more attribute flags are set as "1" simultaneously in the combined attribute data have been described in the first embodiment. Also in this second embodiment, what image processing is to be applied using such attribute data should be determined appropriately case by case. What is important is to minimize the loss in the information of the scan attribute data and the PDL attribute data so as to generate combined attribute data that would prevent the image quality from decreasing for scan data that has gone through the image-editing apparatus.

Further, the second embodiment has proposed merge processing that would give priority to the information of the PDL attribute data 17022 over the information of the scan attribute data 17021. Alternatively, merge processing that would give priority to the information of the scan attribute data 17021 over the information of the PDL attribute data 17022 may also be employed.

As described above, in this embodiment, even though the number of bits in the combined attribute data is smaller than the number of attribute types in the scan attribute data and the PDL attribute data, attribute data can be combined so as to prevent the attribute information necessary for image processing from being lost. Appropriate output image processing can be applied to image data by carrying out the above-described merge processing to generate combined attribute data.

Although in the foregoing embodiments intermediate image processing 26300 is carried out in the image-editing apparatus shown in FIG. 5, the same advantages can be afforded by carrying out intermediate image processing in the image-forming apparatus, combining the image and attribute flag data, and then transferring the resultant data from the image-forming apparatus to the image-editing apparatus.

Furthermore, although in the foregoing embodiments the attribute flag data is configured of four bits, more than four bits may be used. It is further noted that the combining processing shown along the flowcharts is just examples. Bit operations may be utilized for higher performance to afford the same advantages.

In addition, although in the foregoing embodiment the character attribute is saved with higher priority, another attribute may also be saved with higher priority to afford the same advantages.

As described above, according to the present invention, high-quality image data is provided by exploiting image-data attribute information generated from read-out image data even if the read-out image data has been edited in the image-editing apparatus and then subjected to image processing in the image-processing apparatus for image formation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-366005 filed Dec. 17, 2004, which is hereby incorporated by reference herein in its entirety.

What is claimed is:

1. An image processing apparatus for transferring scan image data acquired by a document reader to an editing apparatus and receiving print data based on the scan image data from the editing apparatus to perform image processing, the image processing apparatus comprising:
   a first generator configured to generate first attribute data from the scan image data acquired by the document reader, the first attribute data indicating an image attribute constituting the scan image data;
   a second generator configured to generate second attribute data based on the print data received from the editing apparatus, the second attribute data indicating an image attribute constituting print image data generated based on the print data; and
   a third generator configured to generate third attribute data for each pixel constituting the print image data based on attribute information of corresponding pixels in the first attribute data and attribute information of corresponding pixels in the second attribute data, wherein
   one of the first, second and third attribute data indicates whether or not each pixel in image data shows a character.

2. The image processing apparatus according to claim 1, wherein each of the first, second, and third attribute data is composed of a bit string including at least two bits and an attribute type is defined in each bit, and
   wherein the third generator is configured to generate the third attribute data by determining each bit value in the third attribute data according to an attribute type and a bit value of each bit in the first attribute data and the second attribute data.

3. The image processing apparatus according to claim 2, wherein, the third generator assigns the value of each bit in the first attribute data to the corresponding bit in the third attribute data, and changes a value of a predetermined bit in the third attribute data based on the value of a bit indicating a predetermined attribute type in the second attribute data.

4. The image processing apparatus according to claim 2, wherein the third generator performs calculation of a predetermined bit value in the first attribute data and a predetermined bit value in the second attribute data, and assigns a calculation result to a predetermined bit in the third attribute data.

5. The image processing apparatus according to claim 1, further comprising a transmitter configured to transmit the first attribute data generated by the first generator together with the scan image data to the editing apparatus.

6. The image processing apparatus according to claim 5, wherein, if the first attribute data is edited by the editing apparatus, the third generator generates the third attribute data using the first attribute data edited by the editing apparatus and the second attribute data.

7. A method for controlling an image processing apparatus for transferring scan image data acquired by a document reader to an editing apparatus and receiving print data based on the scan image data from the editing apparatus to perform image processing, the method comprising:
   generating first attribute data from the scan image data acquired by the document reader, the first attribute data indicating an image attribute constituting the scan image data;
   generating second attribute data based on the print data received from the editing apparatus, the second attribute data indicating an image attribute constituting print image data generated based on the print data; and
   generating third attribute data for each of the pixels constituting the print image data based on attribute information of the corresponding pixel in the first attribute data and attribute information of the corresponding pixel in the second attribute data, wherein
   one of the first, second and third attribute data indicates whether or not each pixel in image data shows a character.

8. The method according to claim 7, wherein each of the first, second, and third attribute data is composed of a bit string including at least two bits and an attribute type is defined in each bit, and
   wherein the third attribute data is generated by determining each bit value in the third attribute data according to an attribute type and a bit value of each bit in the first attribute data and the second attribute data.

9. The method according to claim 8, wherein in the step of generating the third attribute data, the value of each bit in the first attribute data is assigned to the corresponding bit in the third attribute data, and a value of a predetermined bit in the third attribute data is changed based on the value of a bit indicating a predetermined attribute type in the second attribute data.

10. The method according to claim 8, wherein in the step of generating the third attribute data, calculation of a predetermined bit value in the first attribute data and a predetermined bit value in the second attribute data is performed, and a calculation result is assigned to a predetermined bit in the third attribute data.

11. The method according to claim 7, further comprising transmitting the first attribute data together with the scan image data to the editing apparatus.

12. The method according to claim 11, wherein, if the first attribute data is edited by the editing apparatus, the third attribute data is generated using the first attribute data edited by the editing apparatus and the second attribute data in the step of generating the third attribute data.

13. A computer readable medium containing computer-executable instructions for controlling an image processing apparatus for transferring scan image data acquired by a document reader to an editing apparatus and receiving print data based on the scan image data from the editing apparatus to perform image processing, the computer readable medium comprising:

computer-executable instructions for generating first attribute data from the scan image data acquired by the document reader, the first attribute data indicating an image attribute constituting the scan image data;

computer-executable instructions for generating second attribute data based on the print data received from the editing apparatus, the second attribute data indicating an image attribute constituting print image data generated based on the print data; and computer-executable instructions for generating third attribute data for each of the pixels constituting the print image data based on attribute information of the corresponding pixel in the first attribute data and attribute information of the corresponding pixel in the second attribute data, wherein one of the first, second and third attribute data indicates whether or not each pixel in image data shows a character.

14. The computer readable medium according to claim 13, wherein each of the first, second, and third attribute data is composed of a bit string including at least two bits and an attribute type is defined in each bit, and wherein the third attribute data is generated by determining each bit value in the third attribute data according to an attribute type and a bit value of each bit in the first attribute data and the second attribute data.

15. The computer-executable instructions according to claim 14, wherein in the generation the third attribute data, the value of each bit in the first attribute data is assigned to the corresponding bit in the third attribute data, and a value of a predetermined bit in the third attribute data is changed based on the value of a bit indicating a predetermined attribute type in the second attribute data.

16. The computer-executable instructions according to claim 14, wherein in the generation the third attribute data, calculation of a predetermined bit value in the first attribute data and a predetermined bit value in the second attribute data is performed, and a calculation result is assigned to a predetermined bit in the third attribute data.

17. The computer-executable instructions according to claim 13, further comprising computer-executable instructions for transmitting the first attribute data together with the scan image data to the editing apparatus.

18. The computer-executable instructions according to claim 17, wherein, if the first attribute data is edited by the editing apparatus, the third attribute data is generated using the first attribute data edited by the editing apparatus and the second attribute data in the step of generating the third attribute data.

\* \* \* \* \*